(12) United States Patent
Hirano

(10) Patent No.: US 7,499,198 B2
(45) Date of Patent: Mar. 3, 2009

(54) THRESHOLD VALUE MATRIX, IMAGE PROCESSING APPARATUS, IMAGE FORMING APPARATUS AND PRINTER DRIVER

(75) Inventor: Masanori Hirano, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 832 days.

(21) Appl. No.: 10/517,356

(22) PCT Filed: May 28, 2003

(86) PCT No.: PCT/JP03/06667

§ 371 (c)(1),
(2), (4) Date: Nov. 22, 2004

(87) PCT Pub. No.: WO03/105461

PCT Pub. Date: Dec. 18, 2003

(65) Prior Publication Data

US 2005/0200900 A1 Sep. 15, 2005

(30) Foreign Application Priority Data

Jun. 11, 2002 (JP) ............................. 2002-169394

(51) Int. Cl.
*H04N 1/405* (2006.01)
(52) U.S. Cl. ..................................... 358/3.14; 358/3.13
(58) Field of Classification Search .................. 358/1.9, 358/2.1, 3.06, 3.09–3.14, 3.16
See application file for complete search history.

(56) References Cited

U.S. PATENT DOCUMENTS

| | | | |
|---|---|---|---|
| 5,258,850 A | 11/1993 | Tai | |
| 5,617,123 A | 4/1997 | Takaoka et al. | |
| 5,646,739 A | 7/1997 | Kawai | |
| 5,920,682 A | 7/1999 | Shu et al. | |
| 6,188,491 B1 | 2/2001 | Nagashima | |
| 6,714,320 B1 | 3/2004 | Nakahara et al. | |
| 2006/0044616 A1* | 3/2006 | Satoh et al. | 358/3.01 |

FOREIGN PATENT DOCUMENTS

| | | |
|---|---|---|
| DE | 10026995 | 3/2001 |
| JP | 9-247475 | 9/1997 |
| JP | 2000-350027 | 12/2000 |
| JP | 2001-61064 | 3/2001 |
| JP | 2001-69347 | 3/2001 |
| JP | 2001-86336 | 3/2001 |
| JP | 2002-118746 | 4/2002 |

OTHER PUBLICATIONS

Mar. 1, 2007 EPO Communication and European search report in connection with European application EP 03 73 3124.

* cited by examiner

*Primary Examiner*—Thomas D Lee
*Assistant Examiner*—Stephen M Brinich
(74) *Attorney, Agent, or Firm*—Cooper & Dunham, LLP

(57) ABSTRACT

A threshold value matrix is used for converting a multi-level image data into a plural-level image data which represents a dot pattern by a smaller number of gradation levels than the multi-level image data, and comprises threshold values used for making a dot representation solely by a dot pattern while maintaining an identical keytone for all halftone levels.

38 Claims, 30 Drawing Sheets

KEYTONE EXISTS

KEYTONE EXISTS

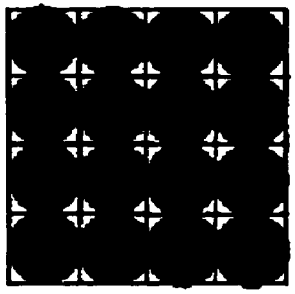
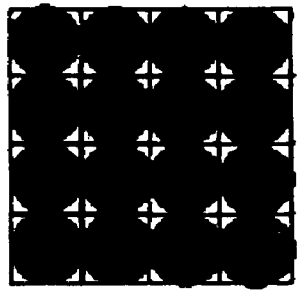
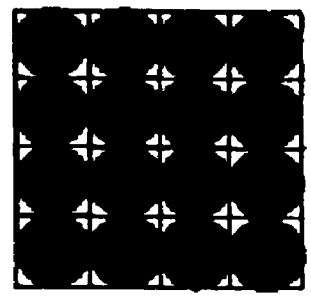
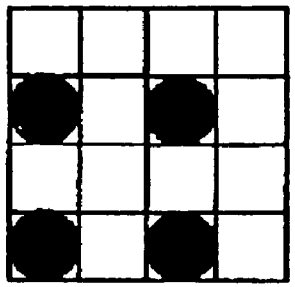
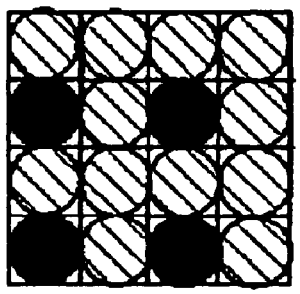
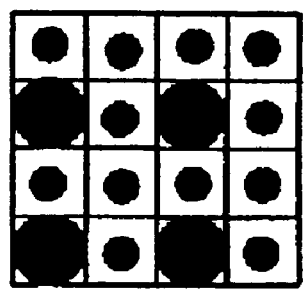
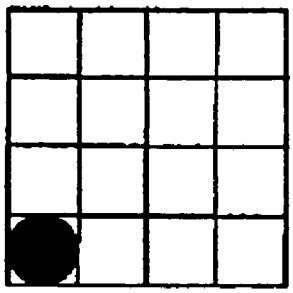
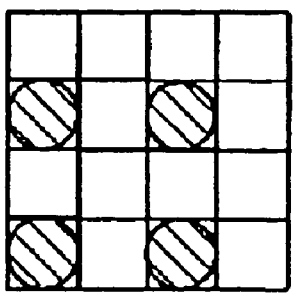
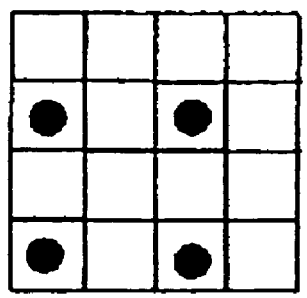
FIG.1A     FIG.1B     FIG.1C

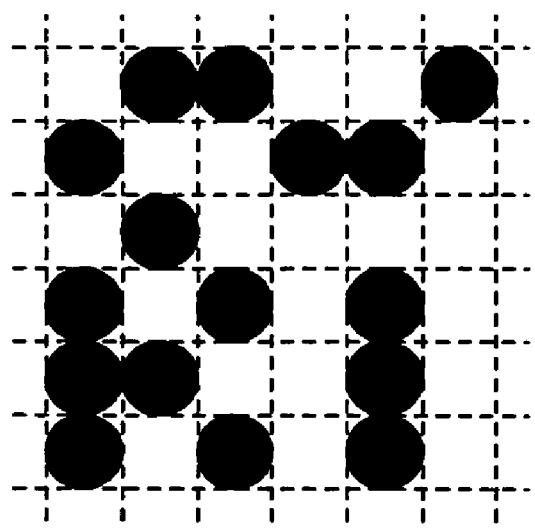

FIG.4A

| 2 | 18 | 6 | 22 |
|---|---|---|---|
| 30 | 10 | 26 | 14 |
| 8 | 24 | 4 | 20 |
| 28 | 16 | 32 | 12 |

FIG.4B

| 38 | 86 | 50 | 98 |
|---|---|---|---|
| 122 | 62 | 110 | 74 |
| 56 | 104 | 44 | 92 |
| 116 | 80 | 128 | 68 |

FIG.4C

| 136 | 200 | 152 | 216 |
|---|---|---|---|
| 248 | 168 | 232 | 184 |
| 160 | 224 | 144 | 208 |
| 240 | 192 | 255 | 176 |

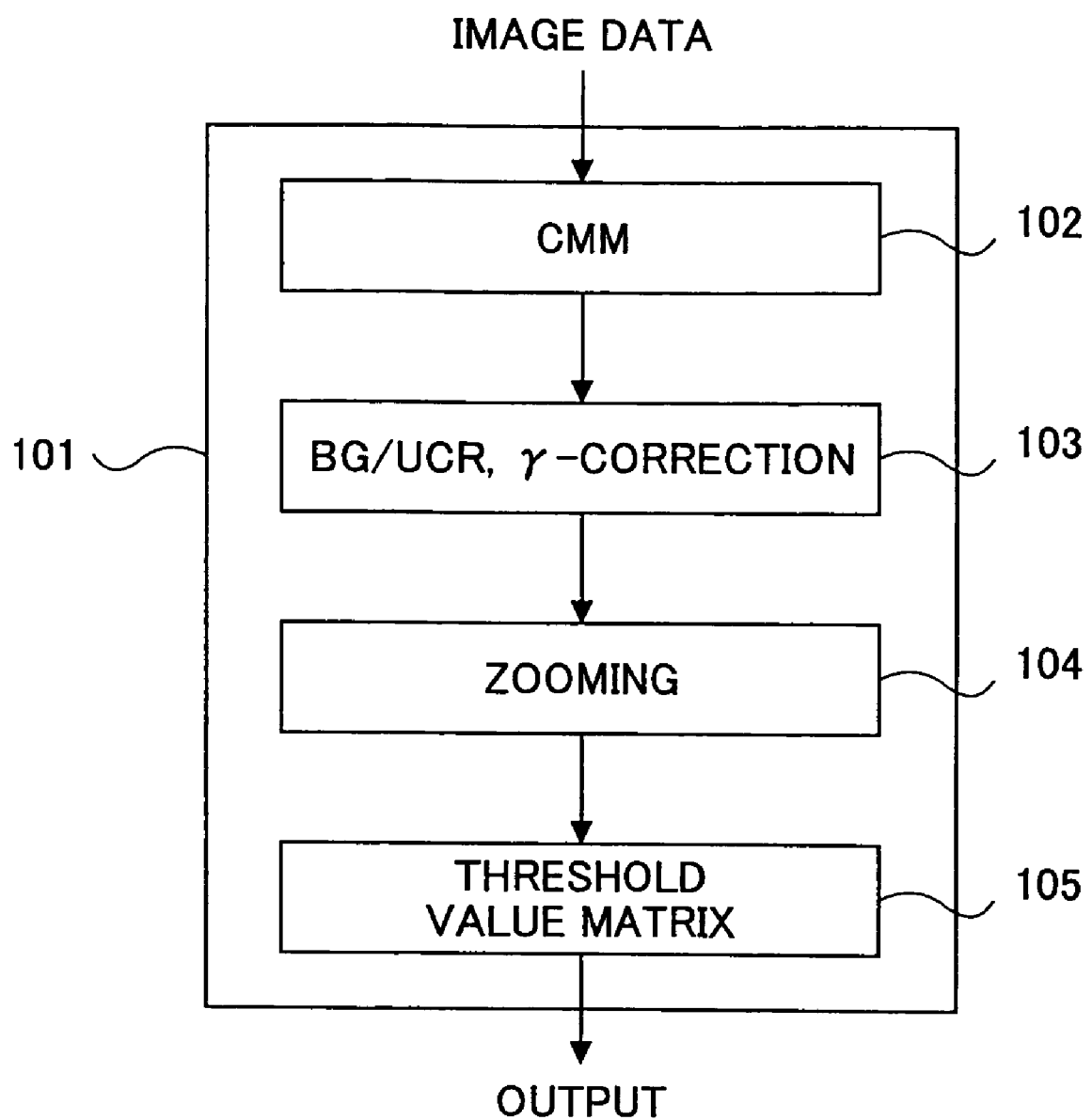

FIG.22A  FIG.22B
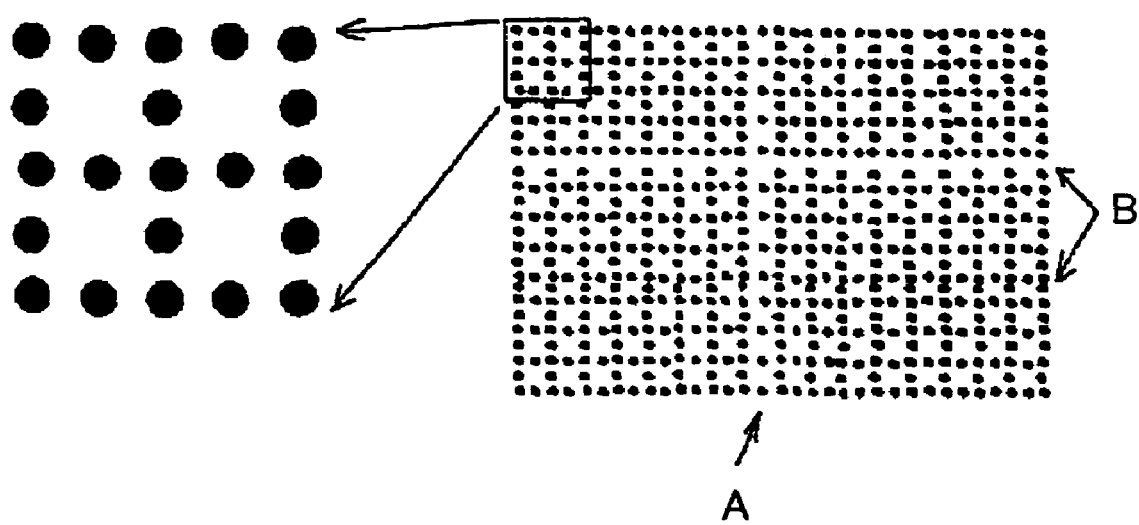
FIG.23A  FIG.23B
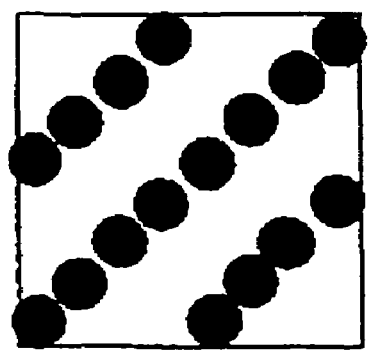
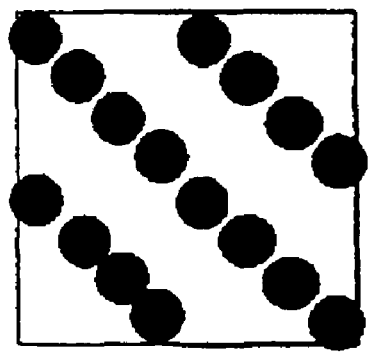

FIG.26A 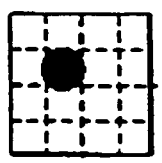 FIG.26B 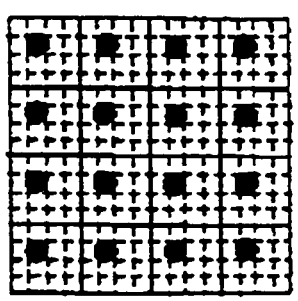  FIG.26C 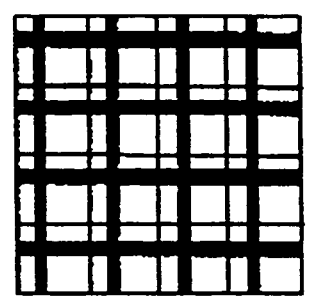
FIG.27A 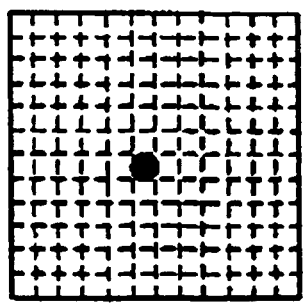  FIG.27B 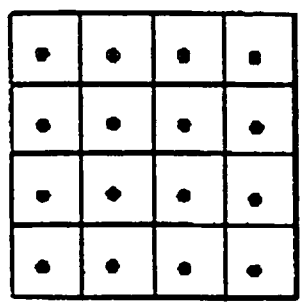  FIG.27C 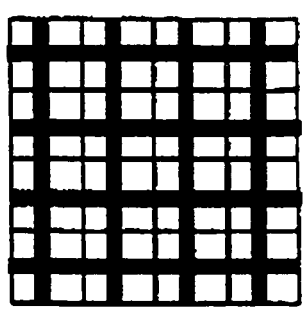

FIG.28A  FIG.28B  FIG.28C
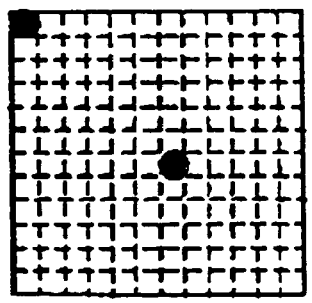 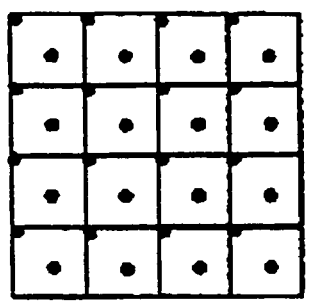 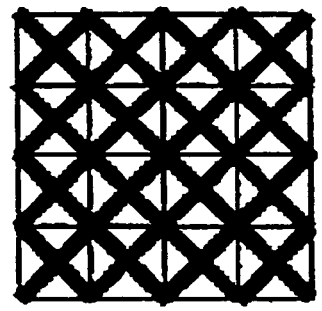
FIG.29A  FIG.29B  FIG.29C
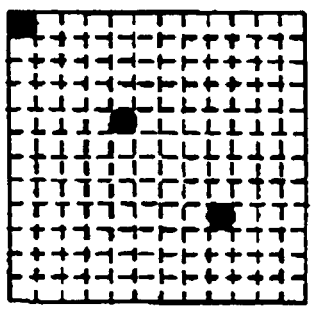 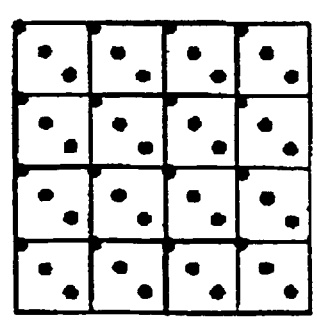 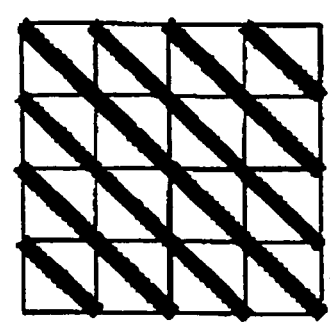

FIG.30A

| 1 | 5 | 9 | 13 |
|---|---|---|---|
| 14 | 2 | 6 | 10 |
| 11 | 15 | 3 | 7 |
| 8 | 12 | 16 | 4 |

FIG.30B

| 1 | 2 | 3 | 4 |
|---|---|---|---|
| 4 | 1 | 2 | 3 |
| 3 | 4 | 1 | 2 |
| 2 | 3 | 4 | 1 |

| 1 | 13 | 25 | 17 |
|---|---|---|---|
| 29 | 5 | 9 | |
| | | 33 | |
| | 21 | | |

FIG.30E

| 1 | 17 | 33 | 49 |
|---|---|---|---|
| 53 | 5 | 21 | 37 |
| 41 | 57 | 9 | 25 |
| 29 | 45 | 61 | 13 |

FIG.30F

| 1 | 9 |
|---|---|
| 13 | 5 |

KEYTONE
EXISTS

KEYTONE
EXISTS

KEYTONE
LOST

KEYTONE
EXISTS

DOT SIZE
SWITCHING

FIG.34A    FIG.34B    FIG.34C

1ST LEVEL AFTER
DOT SIZE SWITCHING

| 5 | 50 | 27 | 41 |
|---|----|----|----|
| 32 | 63 | 9 | 59 |
| (73) | 23 | 68 | 45 |
| 14 | 54 | 36 | 18 |

| (80) | 148 | 114 | 134 |
|------|-----|-----|-----|
| 121 | 168 | 36 | 161 |
| (182) | 107 | 175 | 141 |
| 92 | 155 | 127 | 98 |

| (187) | 232 | 209 | 223 |
|-------|-----|-----|-----|
| 214 | 245 | 191 | 241 |
| 255 | 205 | 250 | 227 |
| 196 | 236 | 218 | 200 |

THRESHOLD LEVEL AT
WHICH KEYTONE IS LOST

FIG.35A    FIG.35B    FIG.35C

SET TO SAME
THRESHOLD VALUE

| 5 | 50 | 27 | 41 |
|---|----|----|----|
| 32 | 63 | 9 | 59 |
| (80) | 23 | 68 | 45 |
| 14 | 54 | 36 | 18 |

| (80) | 148 | 114 | 134 |
|------|-----|-----|-----|
| 121 | 168 | 36 | 161 |
| (187) | 107 | 175 | 141 |
| 92 | 155 | 127 | 98 |

| (187) | 232 | 209 | 223 |
|-------|-----|-----|-----|
| 214 | 245 | 191 | 241 |
| 255 | 205 | 250 | 227 |
| 196 | 236 | 218 | 200 |

SET TO SAME
THRESHOLD VALUE

THRESHOLD VALUE MATRIX, IMAGE PROCESSING APPARATUS, IMAGE FORMING APPARATUS AND PRINTER DRIVER

TECHNICAL FIELD

This disclosure generally relates to threshold value matrixes, image processing apparatuses, image forming apparatuses and printer drivers, and more particularly to a threshold value matrix which is used for a halftone processing, an image processing apparatus, an image forming apparatus and a printer driver which use such a threshold value matrix.

BACKGROUND ART

In the conventional image forming apparatuses (or image recording apparatuses) such as the printers, facsimile machines and copying machines, a digital image data which is formed is a bi-level image made up of "1"s and "0"s or, dots having ON and OFF states. But due to progresses made in image forming engines and the demands for realizing a high-quality image, it is becoming more popular to form plural-level (or multi-level) image data which represent each pixel in a plurality of gradation levels.

In this specification, the "plural-level" is used similarly to the generally used terms "multi-level" and "bi-level", but the amount of information included in the plural-level image data is greater than that of the bi-level image data but less than or equal to that of the multi-level image data. Normally, when carrying out an image processing, the multi-level image data which is used as the input image data has an amount of information on the order of approximately 8 bits (256 values) per pixel. But in a case where the image forming apparatus which actually forms an image based on the input image data is only capable of representing approximately 1 bit to 3 bits per pixel, the image data has more levels than "bi-level" but only has a small number of levels as a "multi-level", and is thus referred to as a "plural-level image data".

For example, in the ink-jet printer, the tone modulation method which changes the tone of the ink, the dot size modulation method which uses dots having different sizes, and the method which uses both the tone modulation method and the dot size modulation method are most commonly used at the present.

In the ink-jet printer, a pressure generating means of an ink-jet head is formed by a heating resistor which generates air bubbles in the case of the thermal ink-jet, a piezoelectric element in the case of the piezoelectric ink-jet, and an electrostatic element in the case of the electrostatic ink-jet. The dot size is controlled by controlling an amplitude, a pulse width, a number of pulses and the like of a driving voltage which is applied to electrodes of such pressure generating means. However, due to the spreading of the ink and the like, the dot size control can realize only four states at the most with a satisfactory reproducibility, namely, a large dot, a medium dot, a small dot and no dot.

FIGS. 1A through 1C are diagrams for explaining dot layout patterns which are used when carrying out the general binarization process and the plural-level process. FIG. 1A shows the dot reproduction for a case where the binarization process is carried out, FIG. 1B shows the dot reproduction for a case where the plural-level process (tone modulation) is carried out, and FIG. 1C shows the dot reproduction for a case where the plural-level process (dot size modulation) is carried out. In FIGS. 1A through 1C, black circular marks indicate the dots, and circular marks with hatching indicate dots having a lower tone than the dots indicated by the black circular marks. Further, in FIGS. 1A through 1C, the dot pattern on the left indicates a low (light) tone, the dot pattern in the middle indicates a medium tone, and the dot pattern on the right indicates a high (dark or maximum) tone.

According to the dot reproduction shown in FIGS. 1A through 1C, the amount of information is basically determined by the controllable dot size. The amount of information increases as the number of controllable dot sizes increases, to thereby enable reproduction of a high-quality picture close to the original image data. But as described above, the number of controllable dot sizes is only on the order of 1 to 3 (or 4 when 0 is included) in the case of most ink-jet printers. It is possible to improve the picture quality to a certain extent by combining the dot size modulation method and the tone modulation method, but the load is then put on the coloring agents (dyes) and recording units in order to achieve the desired picture quality. Consequently, due to cost and size restrictions on the image forming apparatus, it is only possible to improve the picture quality to two times at the most, even when the dot size modulation method and the tone modulation method are combined.

In order to compensate for the insufficient amount of information per pixel, a pseudo gradation representation which is generally referred to as a halftone process is used as a technique for controlling the number of dots per unit area. The pseudo gradation representation represents the number of dots which are arranged as a tone, and represents a large number of gradation levels by changing the density of the dot. The halftone method includes the dither method and the error diffusion method.

The dither method is popularly used for the pseudo gradation representation, and typical dither methods are the systematic dither method and the random dither method. The systematic dither method sets a sub matrix (or dither matrix) made up of n×n threshold values, and overlaps this dither matrix with the input image to compare the tone level of each pixel and the corresponding threshold value in the dither matrix. A bi-level representation is made by setting a value "1" (black) if the pixel value of the input image is greater than or equal to the corresponding threshold value, and setting a value "0" (white) if the pixel value of the input image is less than the corresponding threshold value. If the processing of n×n pixels ends, the image is formed by repeatedly carrying out the above described process while successively moving the dither matrix to the position of the next n×n pixels.

FIGS. 2A, 2B and 2C are diagrams for explaining the systematic dither method. For example, with respect to an input multi-level image data shown in FIG. 2A, a comparison is made with an n×n dither matrix shown in FIG. 2B which is created by a predetermined method. Hence, only the pixels of the input image having values greater than or equal to the corresponding threshold values are replaced by dots as shown in FIG. 2C. Of course, it is possible to replace only the pixels of the input image having values less than the corresponding threshold values by the dots.

FIG. 2C shows a case where the dots are bi-level, that is, the dots have an ON state or an OFF state. However, the dots may be made to have plural-levels by sectioning the reproducible gradation region into small, medium and large dots as shown in FIG. 3. FIG. 3 is a diagram showing a correspondence between size modulated dots and dither masks. In this case, a threshold value matrix corresponding to the dot size is used for each of the small, medium and large dots, when making the comparison with the input image data to make the replacement to the dots. FIGS. 4A, 4B and 4C are diagrams respectively showing the threshold value matrixes for the small, medium and large dots.

On the other hand, the random dither method generates a random value with respect to each pixel of the input image and uses the generated value as the threshold value. However, the image formed using the random dither method is not very smooth in general, and is unsuited for improving the picture quality as compared to the systematic dither method.

Furthermore, the pseudo gradation representation may be made by the error diffusion method. However, the error diffusion method requires a considerably complex process when compared to the dither methods.

FIG. 5 is a diagram for explaining a bi-level error diffusion technique. In FIG. 5, a step ST1 carries out an error diffusion process shown. Black circular marks indicate the pixels having the dots which are ON, circular marks indicated by a dotted line indicate pixels having the dots which are OFF, and numerals indicate the pixels which are not yet processed. A step ST2 carries out a threshold value process shown. $e_{xy}$ denotes an error generated by the threshold value process, and ⊗ indicates a target pixel which is the target of the next error diffusion process.

A step ST3 multiplies an error weight matrix EWM to the error values of the processed peripheral pixels, and calculates a corrected pixel value CPV by adding the error weight matrix EWM to the value of the next processing target pixel. ⊗ indicates the target pixel which is the target of the next error diffusion process. A step ST4 compares a fixed (or variable) threshold value and the corrected pixel value CPV, and calculates the ON and OFF states of the dots and the error value ($e_{xy}$), where non-segmented image is indicated by "255" and solid color is indicated by "0".

Hence, the error diffusion method carries out the threshold value process for each pixel and holds the error while reflecting the error to the latter calculations at a predetermined ratio. Hence, the error diffusion method can feed back to the output image even the amount of information which is forcibly discarded in the dither process, thereby making it possible to obtain a picture quality which is improved over the dither image from the point of view of the resolution and the like.

Developments are being made to further improve the resolution while obtaining a high picture quality by the dither methods and error diffusion method described above. This is because the individual dot size and separation of the dots become small as the resolution becomes high, and the dot patterns created by the dither method or the error diffusion method become more difficult to recognize. If the dot pattern is not recognizable by the human eye, this is equivalent to making a multi-level representation by 1 pixel. In ink-jet printers which have been recently developed, a resolution of 2880 dpi has been realized.

Although the picture quality is improved by improving the resolution, the cost of the recording unit increases and the recording (printing) speed decreases. In order to realize the high resolution, a high-precision control is required to maintain the high dot position accuracy, in addition to the requirement to form dots which are smaller than the conventionally used dots. As a result, the cost of the image forming apparatus inevitably becomes high. In addition, when using the same recording unit, it takes more time to make the recording for the higher resolution because the coverage area per dot becomes smaller for the higher resolution.

But in actual practice, there are cases where a high picture quality is preferred over the recording speed and cost, and also cases where the desired recording speed and cost are preferred as long as a picture quality higher than a predetermined quality is obtainable. In other words, it is not always the case that the high picture quality is required.

But up to now, all emphasis was put on further improving the dot forming speed and further improving the mounting density of the recording units by means of hardware, while maintaining the high resolution. In other words, the emphasis was put on increasing the recording speed of the image forming apparatuses which are designed for the high picture quality, and not on improving the picture quality of the inexpensive image forming apparatuses which have low resolutions.

When increasing the recording speed of the image forming apparatus which is designed for the high picture quality, it is impossible to realize considerable improvement in the recording speed unless the recording sequence itself is modified, because of the cost restrictions and restrictions on the mounting area. In addition, when the recording sequence is modified, it is impossible to apply the image processing for the high resolution unless the image processing itself is also modified. As a result, it is necessary to modify the image processing depending on the modified recording sequence. But in the conventional image forming apparatuses, only a simple image processing is applied, and no attempts were made to positively improve the picture quality.

SUMMARY

In an aspect of this disclosure, a novel and useful threshold value matrix, image processing apparatus, image forming apparatus and printer driver are provided.

In an aspect of this disclosure, a threshold value matrix, an image processing apparatus, an image forming apparatus and a printer driver are provided, which can obtain a satisfactory picture quality for a low-resolution recording and/or a high-speed recording.

In an exemplary embodiment of this disclosure, a threshold value matrix is provided for converting a multi-level image data into a plural-level image data which represents a dot pattern by a smaller number of gradation levels than the multi-level image data, comprising threshold values used for making a dot representation solely by a dot pattern while maintaining an identical keytone for all halftone levels. According to the above-mentioned threshold value matrix, the threshold values enable the dot representation solely by a dot pattern while constantly maintaining an identical keytone for all halftone levels. For this reason, it is possible to improve the picture quality in the low-resolution recording mode and the high-speed recording mode which do not carry out a dot gravitational center position control or a gradation representation of each pixel by a representation close to a multi-level representation.

The threshold value matrix may further comprise a plurality of sub matrixes; and a basic matrix for combining the sub matrixes, where said sub matrixes and said basic matrix have similar line-group keytones. At least said sub matrixes may have a size of 3×3 and an inclined line-group keytone.

The threshold value matrix may be used to always simultaneously generate three or more dots per gradation level. A threshold value immediately before switching a dot size may gave a value identical to a first threshold value for a dot size of a next stage. The threshold value matrix may exclude a matrix which independently generates a dense dot pattern for which a keytone is not visually recognizable by human eye. Only odd numbered threshold values may be used to form an incomplete set of dots at a gradation level where a keytone is easily lost due to increased dot density. One side of the threshold value matrix may always be a multiple of eight.

A further object of the present invention is to provide. In another exemplary embodiment of this disclosure, an image processing apparatus is provided comprising a processing section carrying out a plural-level process with respect to a multi-level image data to output a plural-level image data which represents a dot pattern by a smaller number of gradation levels than the multi-level image data by use of a threshold value matrix; and a holding section holding said threshold value matrix which includes threshold values which are used for making a dot representation solely by a dot pattern while maintaining an identical keytone for all halftone levels. According to such an image processing apparatus, it is possible to improve the picture quality in the low-resolution recording mode and the high-speed recording mode by use of the threshold value matrix.

In another exemplary embodiment of this disclosure, a printer driver, to be implemented in a computer, is provided for supplying an output image data to an image forming apparatus which forms an image from a plurality of dots, comprising a processing section carrying out a plural-level process with respect to a multi-level image data to output, as the output image data, a plural-level image data which represents a dot pattern by a smaller number of gradation levels than the multi-level image data by use of a threshold value matrix; and a table storing said threshold value matrix which includes threshold values which are used for making a dot representation solely by a dot pattern while maintaining an identical keytone for all halftone levels. According to such a printer engine, it is possible to improve the picture quality in the low-resolution recording mode and the high-speed recording mode by use of the threshold value matrix.

In another exemplary embodiment of this disclosure, an image forming apparatus which forms an image on a recording medium from a plurality of dots is provided, comprising a processing section carrying out a plural-level process with respect to a multi-level image data to output a plural-level image data which represents a dot pattern by a smaller number of gradation levels than the multi-level image data by use of a threshold value matrix; a table storing said threshold value matrix which includes threshold values which are used for making a dot representation solely by a dot pattern while maintaining an identical keytone for all halftone levels; and an imaging section forming the image on the recording medium based on the plural-level image data. According to such an image forming apparatus, it is possible to improve the picture quality in the low-resolution recording mode and the high-speed recording mode by use of the threshold value matrix.

Other aspects and further features of the present invention will be apparent from the following detailed description when read in conjunction with the accompanying drawings.

BRIEF DESCRIPTION OF THE DRAWINGS

FIGS. 1A through 1C are diagrams for explaining dot layout patterns which are used when carrying out a general binarization process and a plural-level process;

FIGS. 2A, 2B and 2C are diagrams for explaining a systematic dither method;

FIGS. 4A, 4B and 4C are diagrams respectively showing threshold value matrixes for small, medium and large dots;

FIG. 17 is a system block diagram showing an embodiment of an image processing apparatus according to the present invention;

FIGS. 22A and 22B are diagrams for explaining interference between the Bayer type dither pattern and the mechanical deviations of the ink-jet printer;

FIGS. 23A and 23B are diagrams for explaining a dot layout pattern having an inclined keytone in an embodiment of a threshold value matrix according to the present invention;

FIGS. 26A, 26B and 26C are diagrams for explaining the keytone formed by tiling a dither mask;

FIGS. 27A, 27B and 27C are diagrams for explaining the tiling and the keytone for a case where the mask has 1 dot per gradation level;

FIGS. 28A, 28B and 28C are diagrams for explaining the tiling and the keytone for a case where the mask has 2 dots per gradation level;

FIGS. 29A, 29B and 29C are diagrams for explaining the tiling and the keytone for a case where the mask has 3 dots per gradation level;

FIGS. 30A, 30B, 30C, 30D, 30E and 30F are diagrams for explaining division of a basic matrix into sub matrixes;

FIGS. 34A through 34C are diagrams for explaining the loss of keytone at the dot size switching part for a particular case;

FIGS. 35A through 35C are diagrams for explaining a process carried out with respect to the loss of keytone at the dot size switching part;

BEST MODE FOR CARRYING OUT THE INVENTION

A description will be given of embodiments of a threshold value matrix, an image processing apparatus, an image forming apparatus and a printer driver (to be implemented in a computer) according to the present invention, which can obtain a satisfactory picture quality for a low-resolution recording and/or a high-speed recording, by referring to FIGS. 6 through 41.

Figure 3:
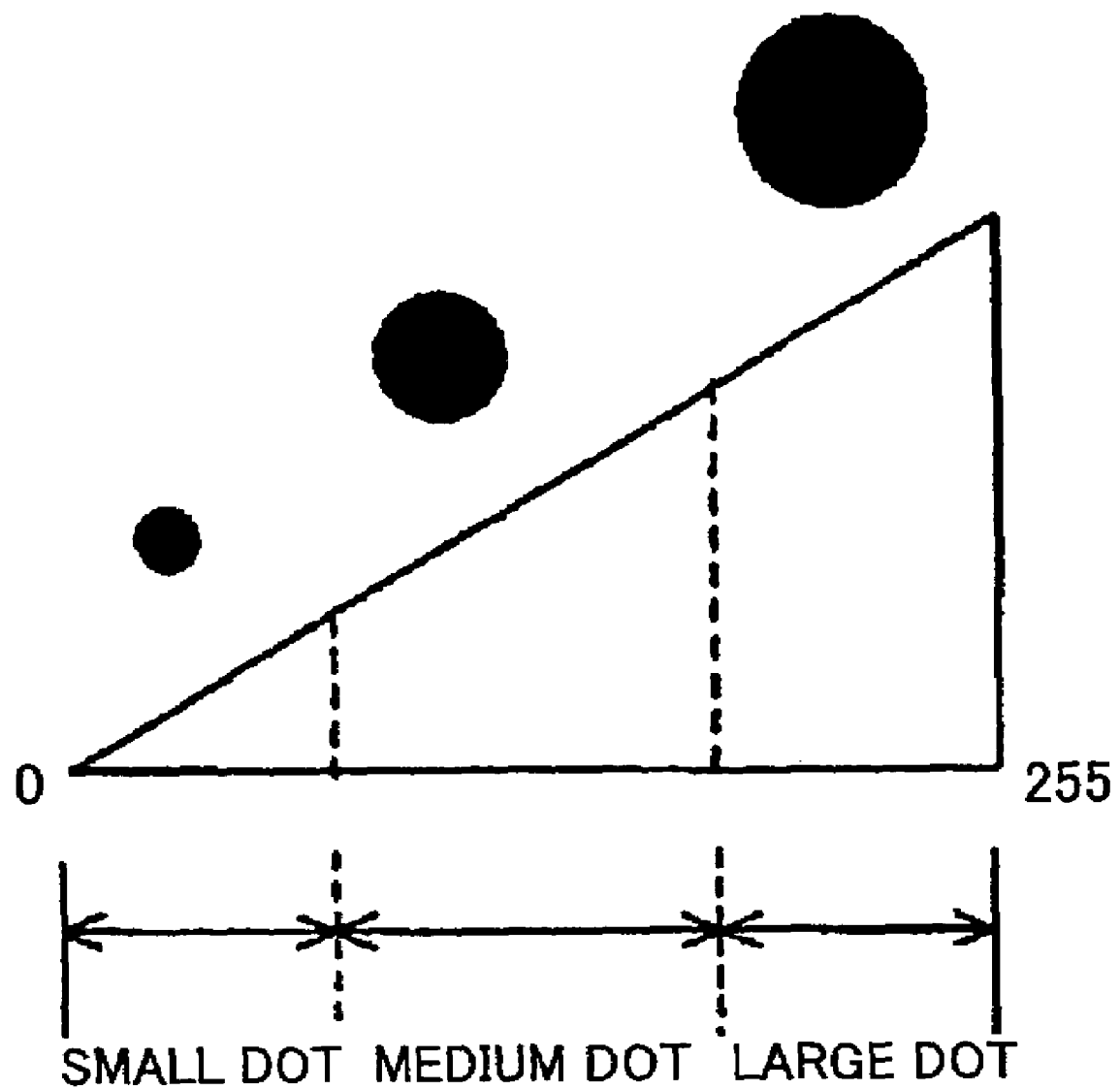
FIG. 3 is a diagram showing a correspondence between size modulated dots and dither masks.
Figure 5:
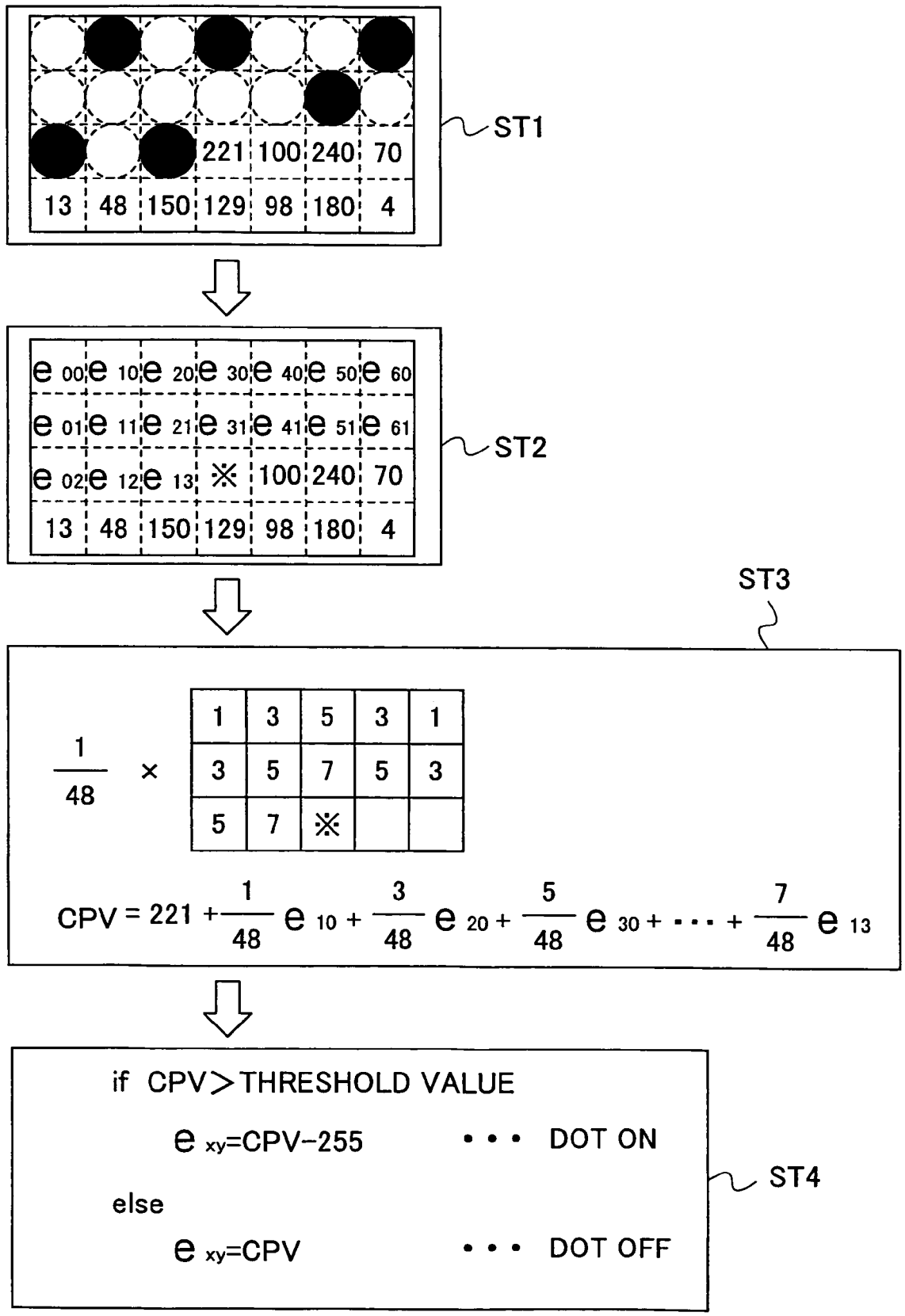
FIG. 5 is a diagram for explaining a bi-level error diffusion technique.
Figure 6:
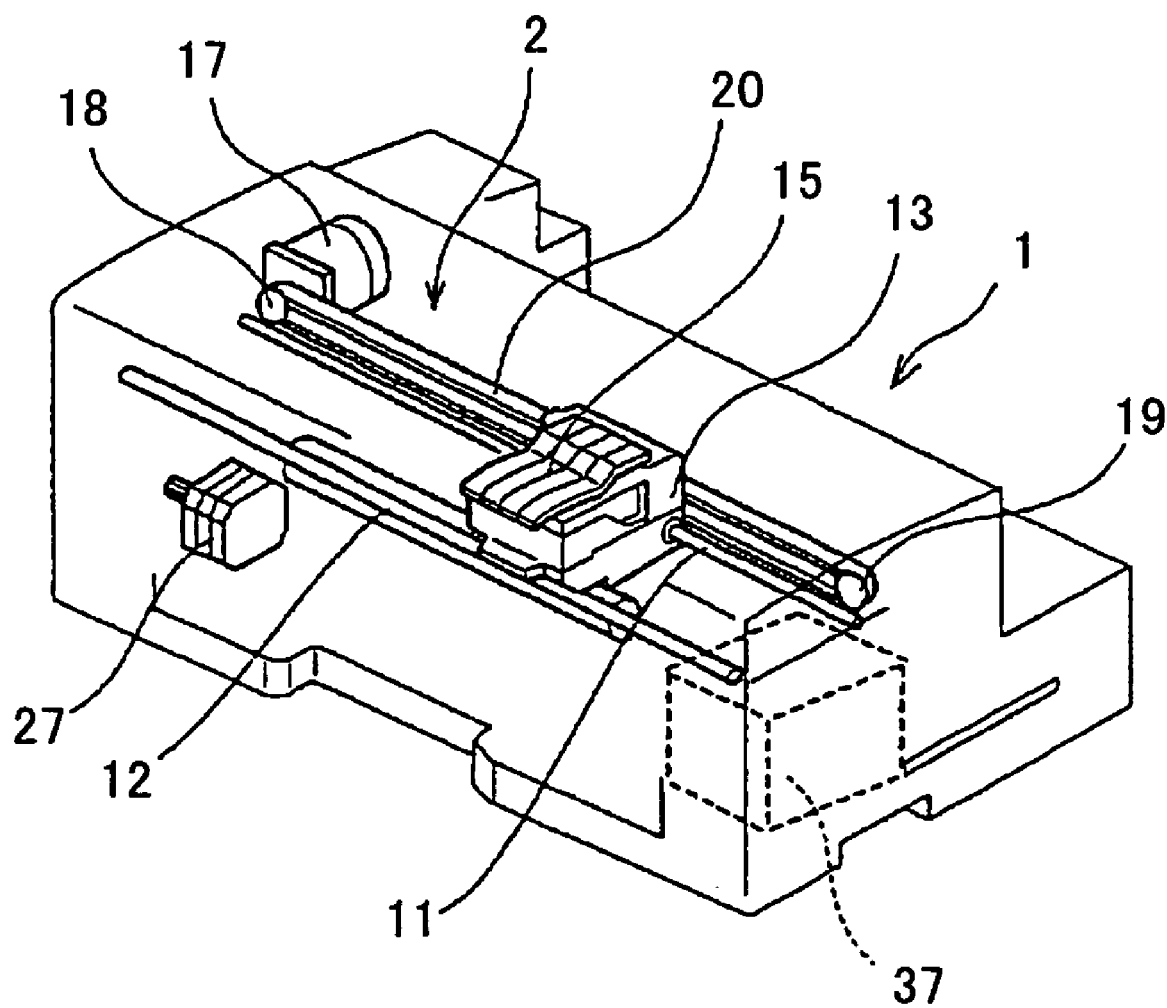
FIG. 6 is a perspective view showing a structure of an embodiment of the image forming apparatus according to the present invention.
Figure 7:
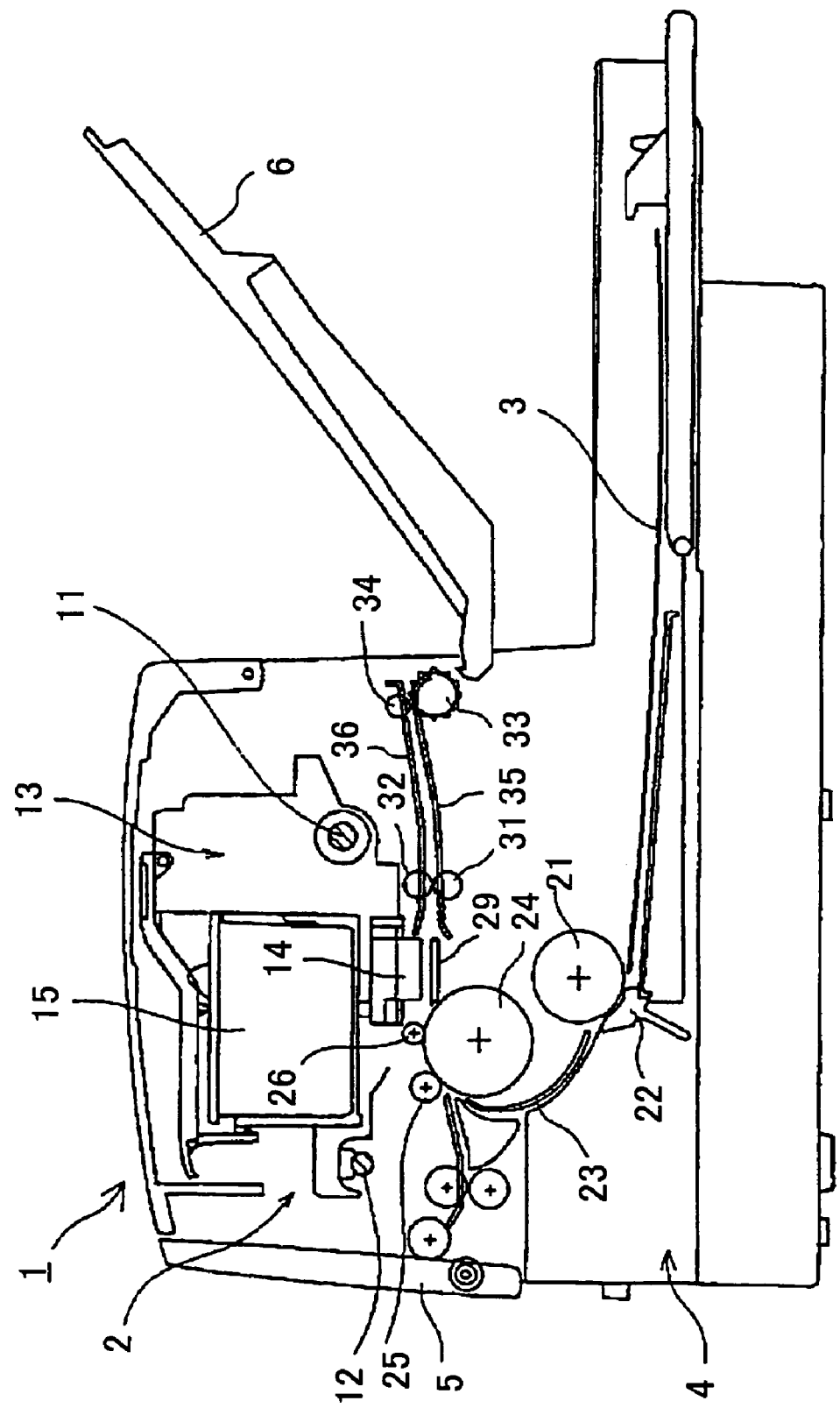
FIG. 7 is a side view showing the structure of the embodiment of the image forming apparatus.

FIG. 6 is a perspective view showing a structure of an embodiment of the image forming apparatus according to the present invention, and FIG. 7 is a side view showing the structure of this embodiment of the image forming apparatus. For the sake of convenience, FIGS. 6 and 7 show important internal parts of the image forming apparatus although actually not visible in the perspective and side views. In this embodiment of the image forming apparatus, the present invention is applied to an ink-jet printer.

In the ink-jet printer shown in FIGS. 6 and 7, a printing mechanism 2 is provided within a main printer body 1. The printing mechanism 2 includes a carriage 13 which is movable in a main scanning direction, recording heads 14 mounted on the carriage 13, and ink cartridges 15 for supplying inks to the recording heads 14. Paper 3 is supplied from a paper supply cassette 4 or a manual paper feed tray 5, and the printing mechanism 2 records an image on the paper 3. The paper 3 recorded with the image is ejected to a paper eject tray 6 which is located on a rear side of the main printer body 1.

In the printing mechanism 2, the carriage 13 is slidably supported by a main guide rod 11 and a sub guide rod 12 so as to be movable in the main scanning direction (in a direction perpendicular to the paper in FIG. 7). The main and sub guide rods 11 and 12 are provided between right and left side plates of the main printer body 1. The recording heads 14 are made up of ink-jet heads for respectively ejecting yellow (Y), cyan (C), magenta (M) and black (Bk) inks in a downward direction. The ink cartridges (ink tanks) 15 for supplying the yellow (Y), cyan (C), magenta (M) and black (Bk) inks to the corresponding ink-jet heads is detachably mounted on top of the carriage 13.

Each ink cartridge 15 has an upper opening which opens to the atmosphere, a lower opening for supplying the ink to the corresponding ink-jet head, and a porous material which is provided inside to hold the ink. The ink within the ink cartridge 15 is maintained to a slightly negative pressure by the capillary force of the porous material. The ink is supplied to the ink cartridge 15 to the corresponding ink-jet head.

The rear side (downstream side along the paper transport direction) of the carriage 13 is slidably supported by the main guide rod 11, and the front side (upstream side along the paper transport direction) of the carriage 13 is slidably supported by the sub guide rod 12. In order to move the carriage 13 in the main scanning direction, a timing belt 20 is between a driving pulley 18 which is driven by a motor 17 and a following pulley 19, and this timing belt 20 is fixed to the carriage 13. Hence, the carriage 13 makes a reciprocal movement as the motor 17 is rotated in the forward and reverse directions.

The recording heads 14 are made up of the ink-jet heads which eject the yellow (Y), cyan (C), magenta (M) and black (Bk) inks in this embodiment. However, it is possible to use a single recording head which ejects the yellow (Y), cyan (C), magenta (M) and black (Bk) inks. As will be described later, it is possible to use for the recording head 14 a piezoelectric type ink-jet head which includes a vibration plate forming at least a portion of a wall of an ink passage, and a piezoelectric element which deforms this vibration plate to apply pressure on the ink.

Of course, the structure of the recording head 14 is not limited to the above. For example, it is possible to use an electrostatic type ink-jet head having a vibration plate forming at least a portion of the wall of the ink passage, and an electrode confronting the vibration plate, where the vibration plate is deformed by electrostatic force to apply pressure on the ink. In addition, it is possible to use a thermal type ink-jet head which generates air bubbles by heating the ink within the ink passage using a heating resistor, so as to apply pressure on the ink by the air bubbles.

On the other hand, in order to transport the paper 3 which is set in the paper supply cassette 4 under the recording head 14, the following mechanisms are provided. That is, a paper supply roller 21 and a friction pad 22 are provided to separate and supply each paper 3 from the paper supply cassette 4 towards a paper guide member 23. A transport roller 24 turns over the side of the paper 3. A transport roller 25 pushes against the peripheral surface of the transport roller 24. A tip end roller 26 restricts a feed angle of the paper 3 from the transport roller 24. The transport roller 24 is driven by a motor 27 via a gear mechanism.

A paper guide member 29 guides the paper 3 which is fed from the transport roller 24 in correspondence with the moving range of the carriage 13 in the main scanning direction, under the recording heads 14. A transport roller 31 which is driven to feed the paper 3 in the paper eject direction, is provided at a position confronting a roller 32, on the downstream side of the paper guide member 29 along the paper transport direction. Further, a paper eject roller and a roller 34 are provided to eject the paper 3 onto the paper eject tray 6, and guide members 35 and 36 are arranged to form a paper eject path.

At the time of the recording, the recording heads 14 are driven in response to an image signal while moving the carriage 13, so as to eject the inks onto the stationary paper 3 and record 1 line. The next line is recorded after transporting the paper 3 by a predetermined amount in the paper transport direction. The recording operation is ended and the paper 3 is ejected in response to a recording end signal or a signal which indicates that a rear end of the paper 3 has reached the recording region of the recording heads 14.

A recovery unit 37 is arranged at a position on the right side in the moving direction of the carriage 13, outside the recording region. The recovery unit 7 includes a cap means, a suction means and a cleaning means, for recovering the recording heads 14 from a state where the ink-ejection is deteriorated or unsatisfactory. The carriage 13 is moved to the position of the recovery unit 37 during a recording wait state, so that the recording heads 14 are capped by the capping means to prevent the ink ejection nozzles of the recording heads 14 from drying and clogging. In addition, when a purge operation is carried out with respect to the ink which is not related to the recording during the recording or the like, the suction means sucks the ink from the ink ejection nozzle of the corresponding recording head 14 and cleans the ink ejection nozzles by the cleaning means, so that the ink viscosity is maintained the same at each of the ink ejection nozzles to maintain a stable ink-jet performance.

When the ink-jet deteriorates, for example, the suction means sucks the ink, air bubbles and the like from the ink-jet nozzles in a state where the ink-jet nozzles are sealed by the capping means. As a result, the cleaning means can remove the ink, dust particles and the like adhered in the vicinity of the ink-jet nozzles, to positively recover the ink-jet performance of the recording heads 14. The inks recovered by the recovery unit 37 are drained to an ink drain tank (not shown) located at the lower portion of the main printer body 1, and is absorbed by an ink absorbing material provided within the ink drain tank.

Figure 8:
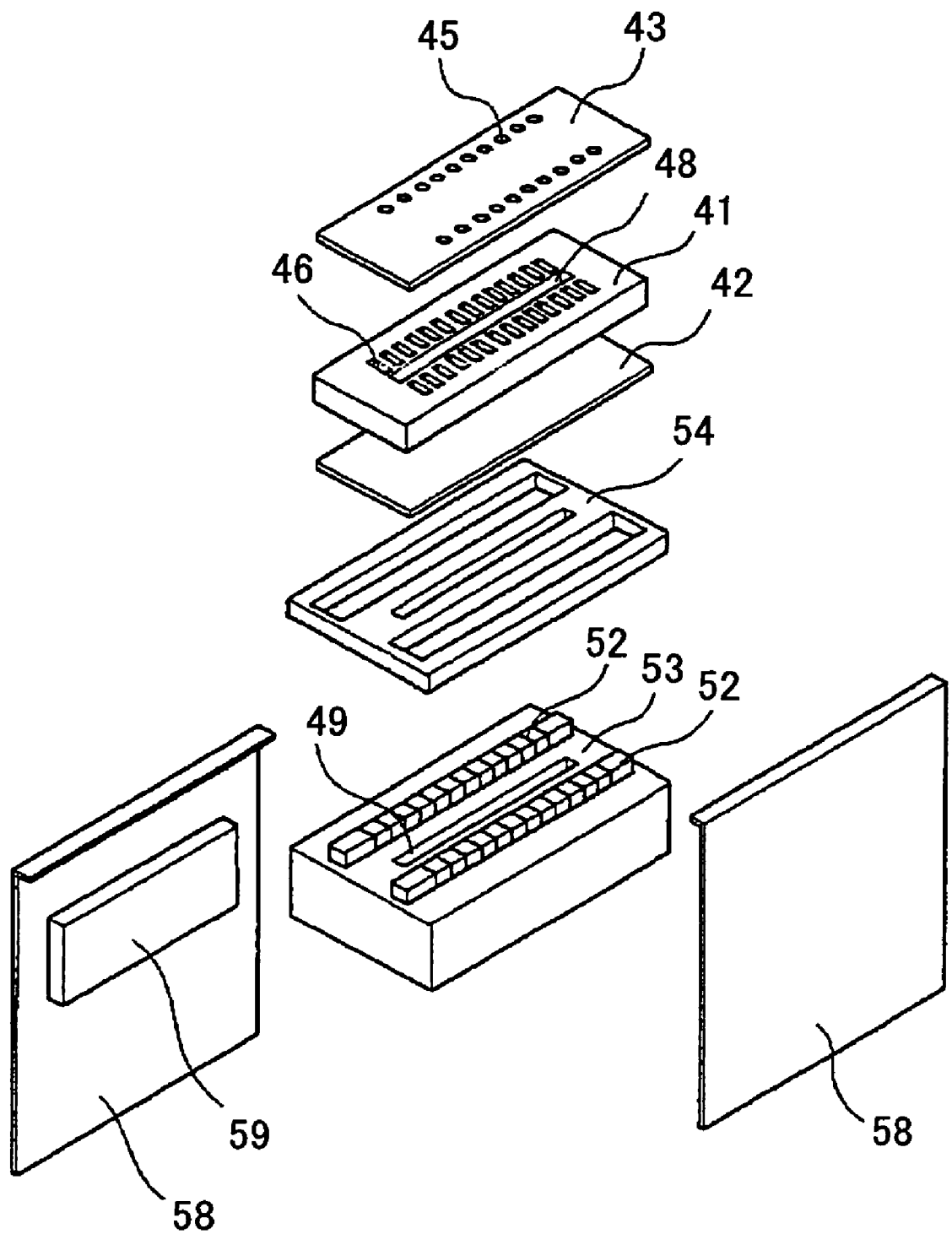
FIG. 8 is a disassembled perspective view of a recording head.
Figure 9:
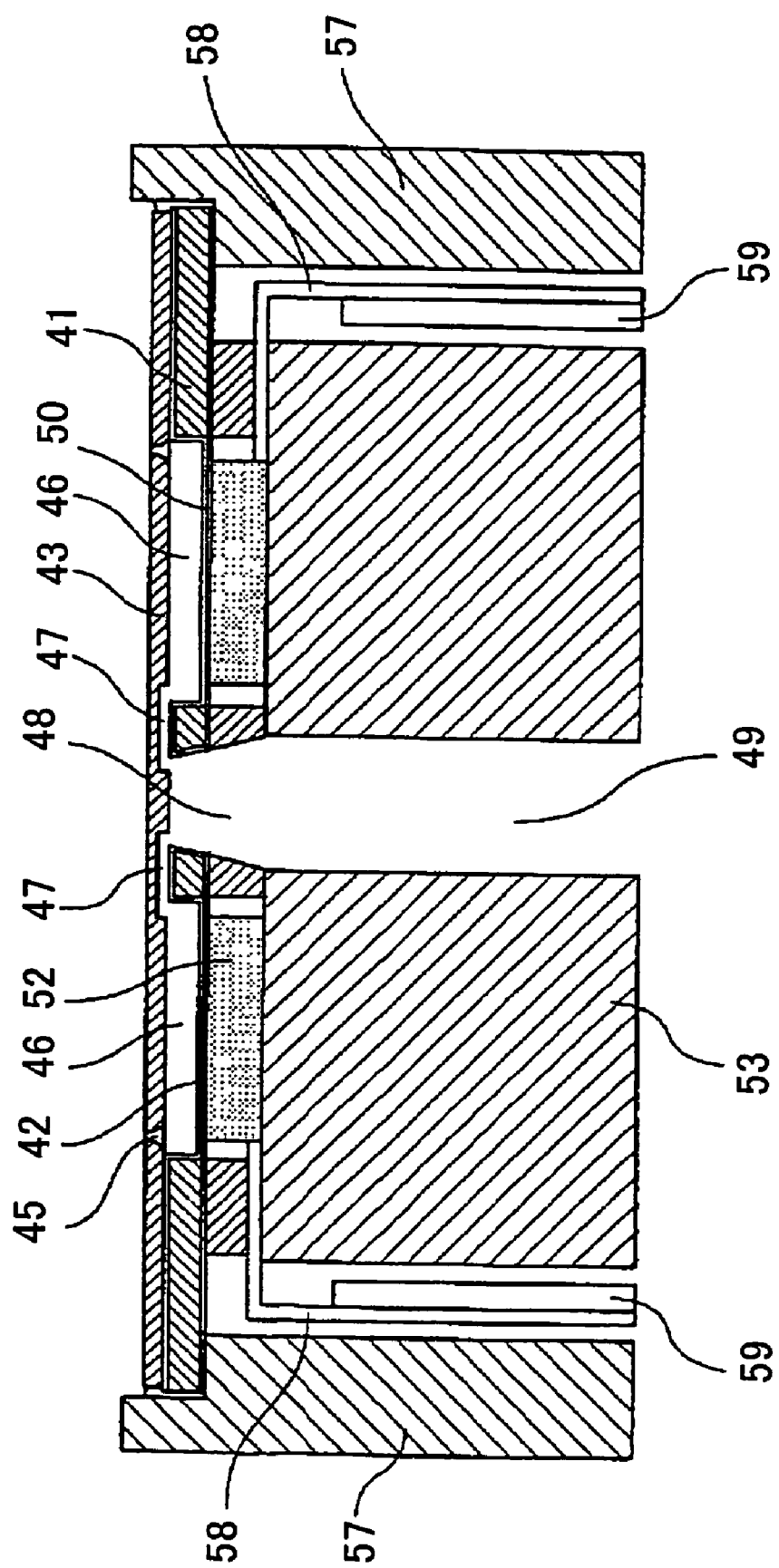
FIG. 9 is a cross sectional view of the recording head along a longitudinal direction of an ink chamber.
Figure 10:
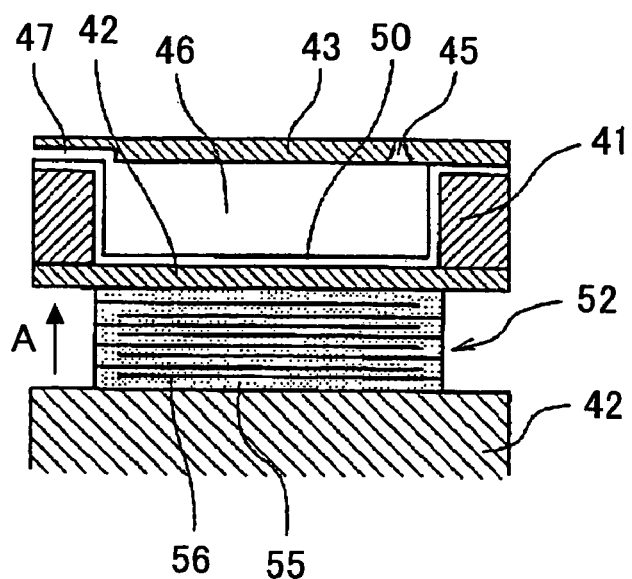
FIG. 10 is an enlarged view showing an important part of FIG. 9.
Figure 11:
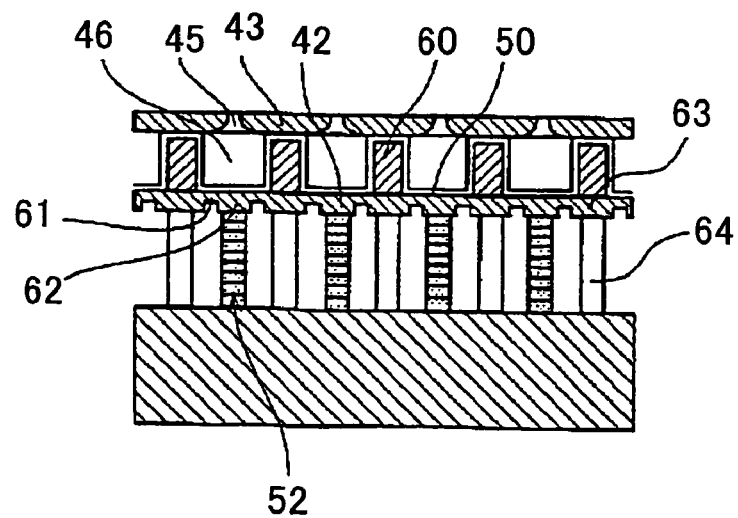
FIG. 11 is a cross sectional view of the recording head along a shorter side of the ink chamber.
Figure 12:
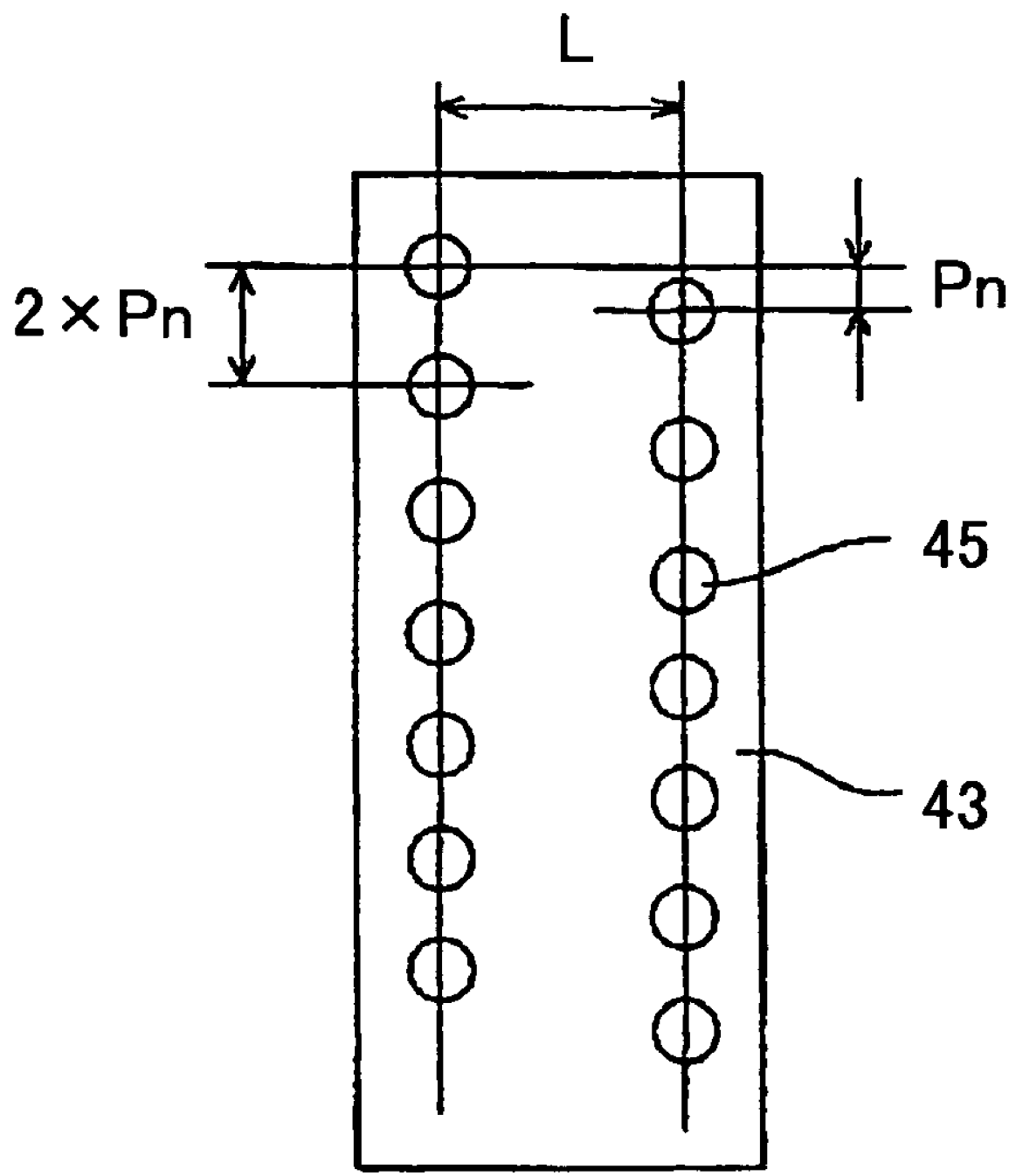
FIG. 12 is a plan view showing a nozzle plate of the recording head.

Next, a description will be given of the recording head 14 of the ink-jet printer, by referring to FIGS. 8 through 12. FIG. 8 is a disassembled perspective view of the recording head. FIG. 9 is a cross sectional view of the recording head along a longitudinal direction of an ink chamber, and FIG. 10 is an enlarged view showing an important part of FIG. 9. FIG. 11 is a cross sectional view of the recording head along a shorter side of the ink chamber. Further, FIG. 12 is a plan view showing a nozzle plate of the recording head.

The recording head 14, that is, the ink-jet head, includes a flow passage forming substrate (flow passage forming member) 41 made of a single crystal silicon substrate, a vibration plate 42 bonded to a lower surface of the flow passage forming substrate 41, and a nozzle plate 43 bonded to an upper surface of the flow passage forming substrate 41. Ink-jet nozzles 45 for ejecting the ink are formed in the nozzle plate 43. The ink-jet nozzles 45 communicate to pressure chambers 46 which form ink flow passages. A common ink chamber 48 supplies the ink to the ink chambers 46 via an ink supply passage 47 which functions as a flow passage resistance portion. A ink resistant thin film 50 made of an organic resin is formed on each wall of the pressure chambers 46, the ink supply passage 47 and the common ink chamber 48 which contact the ink on the flow passage forming substrate 41.

A stacked type piezoelectric element 52 is provided in correspondence with each pressure chamber 46 on the outer surface side (surface side opposite to the common ink chamber 48). In addition, the piezoelectric element 52 is fixed on a base substrate 53. A spacer member 54 is provided around the rows of piezoelectric elements 52.

As shown in FIG. 10, the piezoelectric element 52 has a stacked structure alternately having a piezoelectric material 55 and an internal electrode 56. The corresponding pressure chamber 46 is made to expand and contract due to contraction and expansion of the piezoelectric element 52 having a piezoelectric constant of d33. When a driving signal is applied to the piezoelectric element 52 and a charging is carried out, an expansion takes place in a direction indicated by an arrow A in FIG. 10. On the other hand, when the charge which is charged in the piezoelectric element 52 is discharged, a contraction takes place in a direction opposite to the direction indicated by the arrow A. The base substrate 53 and the spacer member 54 have penetrating holes which form an ink supply opening 49 for supplying the ink from the outside to the common ink chamber 48.

A head frame 57 is formed from an epoxy resin of polyphenylene sulfite by ejection molding. The outer peripheral portion of the flow passage forming substrate 41 and the lower outer edge portion of the vibration plate 42 are bonded to the head frame 57. The head frame 57 and the base substrate 53 are fixed to each other at a portion (not shown) by use of an adhesive agent, for example. A flexible printed circuit (FPC) cable 58 for supplying a driving signal is connected to the piezoelectric elements 52 by soldering, anisotropic conductor film (ACF) or wiring-bonding. A driving circuit (driver IC) 59 for selectively applying the driving signal (driving waveform) to each piezoelectric element 52 is connected to the FPC cable 58.

A (110) crystal face of the single crystal silicon forming the flow passage forming substrate 51 may be subjected to an anisotropic etching using an alkaline etchant such as a potassium hydroxide (KOH) solution, so as to form the penetrating holes which become the pressure chambers 56, a groove portion which becomes the ink supply passage 57, and the penetrating hole which becomes the common ink chamber 58.

As shown in FIG. 11, the vibration plate 42 is made of a metal, such as nickel, by electro-forming. The vibration plate 42 has thin portions 61 corresponding to each pressure chamber 46 so as to facilitate deformation of the vibration plate 42, thick portions 62 which are bonded to the piezoelectric elements 52, and thick portions 63 corresponding to partitioning walls between the pressure chambers 46. The flat surface side of the vibration plate 42 is bonded to the flow passage forming substrate 41 by an adhesive agent, and the thick portions 62 and 63 of the vibration plate 42 are bonded to the head frame 57 by an adhesive agent. Column portions 64 are provided between the base substrate 53 and the corresponding thick portions 63 of the vibration plate 42. The column portions 64 have the same structure as the piezoelectric elements 52.

The nozzle plate 43 includes the ink-jet nozzles 45 having a diameter of approximately 10 μm to 30 μm, at positions corresponding to the pressure chambers 46. The nozzle plate 43 is bonded to the flow passage forming substrate 41 by an adhesive agent. The plurality of ink-jet nozzles 45 form a plurality of dot forming means. As shown in FIG. 12, the rows of nozzles 45 (nozzle rows) are arranged perpendicularly to the main scanning direction. In each row of nozzles 45, a pitch between the nozzles 45 is 2×Pn. A distance between the two rows of nozzles 45 is L. In addition, one row of nozzles 45 and the adjacent row of nozzles 45 are mutually shifted by a pitch Pn along the sub scanning direction, so that the nozzles 45 are arranged in a zigzag manner. Accordingly, an image having a pitch Pn can be formed by one main scan and sub scan.

The nozzle plate 43 may be made of a metal such as stainless steel and nickel, a combination of a metal and a resin film made of a polyimide resin, for example, silicon, or a combination thereof. In addition, in order to secure an ink repellant characteristic at the nozzle surface (ink ejecting surface of the nozzle plate 43 having the nozzles 45 through which the ink is ejected), an ink repellant layer is formed on the nozzle surface by a known method such as plating and ink repellant coating.

In the ink-jet head having the structure described above, the piezoelectric elements 52 are selectively applied with a driving pulse voltage of approximately 20 V to 50 V, so that each selected piezoelectric element which is applied with the driving pulse voltage is displaced in the direction in which the layers of the piezoelectric element 52 are stacked. As a result, each selected piezoelectric element 52 deforms the corresponding vibration plate 42 towards the nozzle 45, thereby causing a change in the volume of the corresponding pressure chamber 46. A pressure is thus applied to the ink within the pressure chamber 46, and an ink drop is ejected from the nozzle 45.

The ejection of the ink drop from the nozzle 45 causes the ink pressure within the pressure chamber 46 to fall, and a slight negative pressure is generated within the pressure chamber 46 due to inertia of the ink flow. In this state, when the driving pulse voltage applied to the piezoelectric element 52 is turned OFF, the corresponding vibration plate 42 returns to its original position and the corresponding pressure chamber 46 returns to its original shape (volume), thereby further generating a negative pressure within the pressure chamber 46. In this state, the ink is supplied from the ink supply opening 49 and is supplied into the pressure chamber 46 via the ink supply passage 47 which forms the flow passage resistance portion. Hence, after the vibration of the ink meniscus surface at the nozzle 45 decays and stabilizes, the driving pulse voltage is applied to the piezoelectric element 52 for the next ink ejection.

Figure 13:
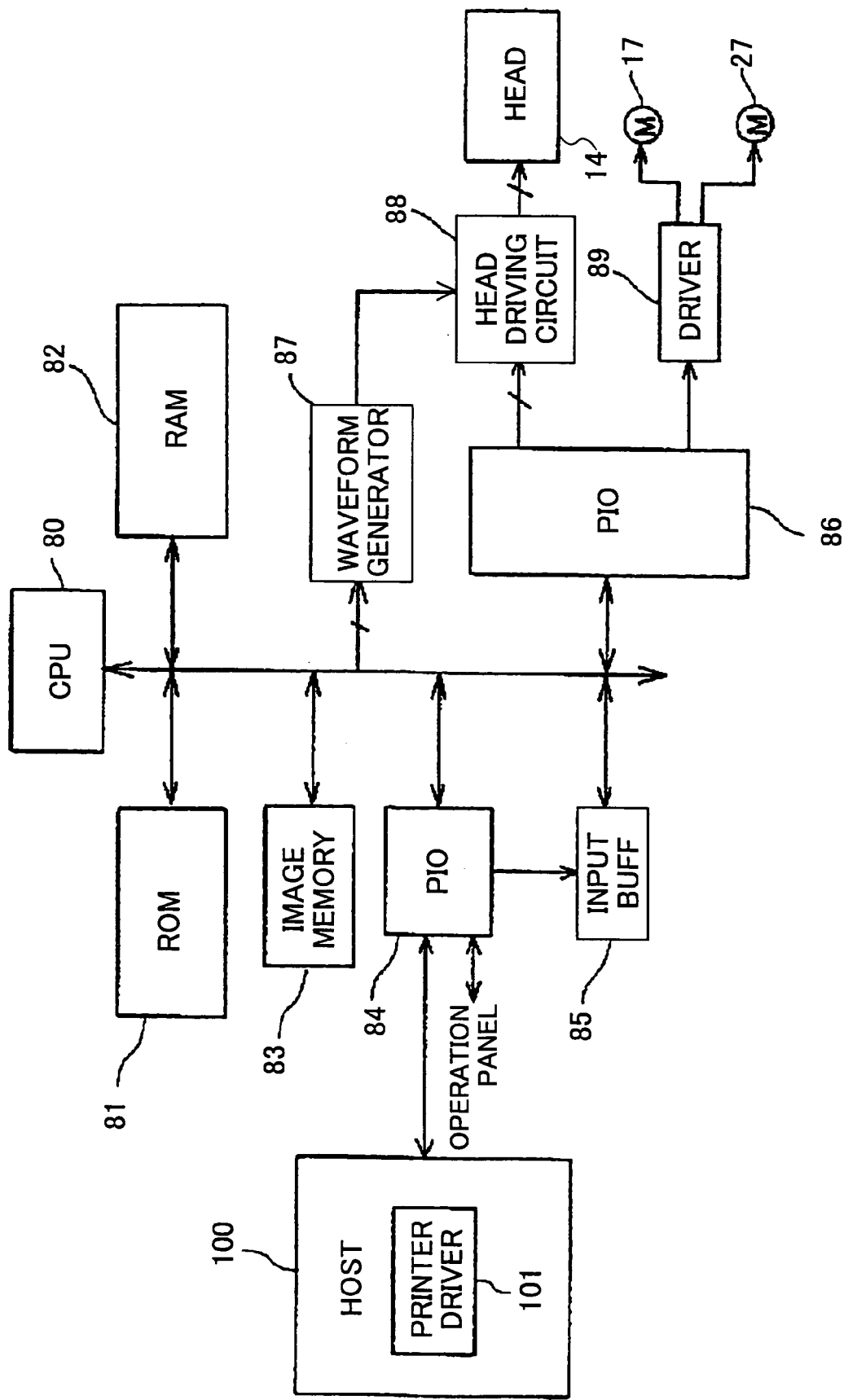
FIG. 13 is a system block diagram generally showing a controller of the ink-jet printer.

Next, a description will be given of a controller of the ink-jet printer, by referring to FIG. 13. FIG. 13 is a system block diagram generally showing a controller of the ink-jet printer.

The controller shown in FIG. 13 includes a microcomputer (CPU) 80 which generally controls the entire ink-jet printer, a ROM 81 which stores predetermined fixed information, a RAM 82 which is used as a work area, an image memory (raster data memory) 83 which stores image data (dot data or dot pattern data) transferred from a host unit 100, a parallel input and output (PIO) port 84, an input buffer 85, a parallel input an output (PIO) port 86, a waveform generating circuit 87, a head driving circuit 88 and a driver 89.

Various information and data such as the image data transferred from a printer driver 101 of the host unit 100, and detection signals from various sensors are input to the PIO port 84. In addition, predetermined information is output with respect to the host unit 100 and an operation panel (not shown) via the PIO port 84.

The waveform generating circuit 87 generates a driving waveform to be applied to the piezoelectric elements 52 of the recording heads 14. As will be described later, the desired driving waveform can be generated by a simple structure by using a digital-to-analog (D/A) converter which subjects a driving waveform data output from the CPU 80 to a digital-to-analog (D/A) conversion.

The head driving circuit 88 applies the driving waveform from the waveform generating circuit 87 to the piezoelectric elements 52 of the selected channels of the recording heads 14, based on various data and signals received via the PIO port 86. Further, the driver 89 drives and controls the motors 17 and 27 based on driving data received via the PIO port 86, so as to move the carriage 13 in the main scanning direction and rotate the transport roller 24 to transport the paper 3 by a predetermined amount.

Figure 14:
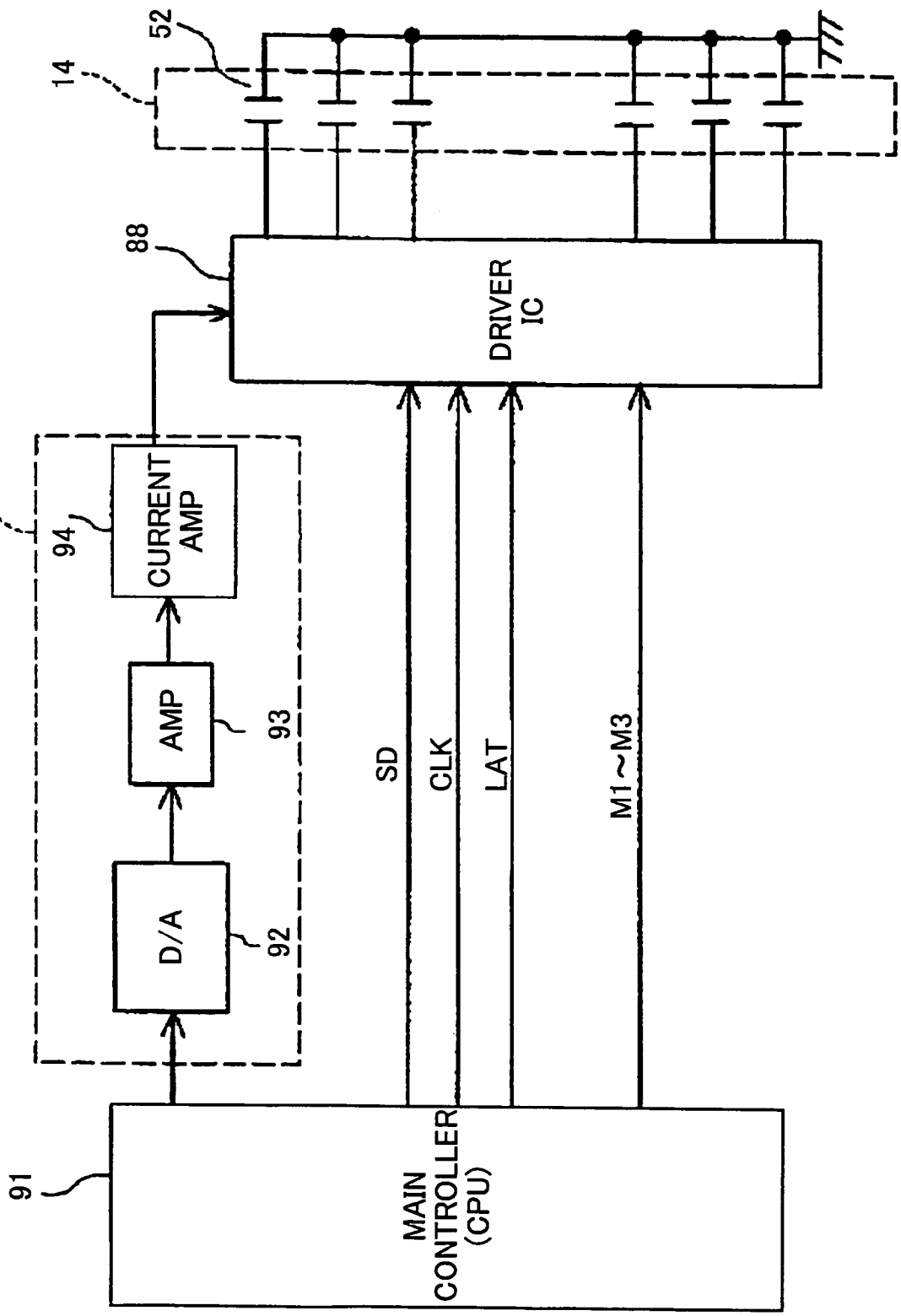
FIG. 14 is a system block diagram showing a driving and control section of the controller.
Figure 15:
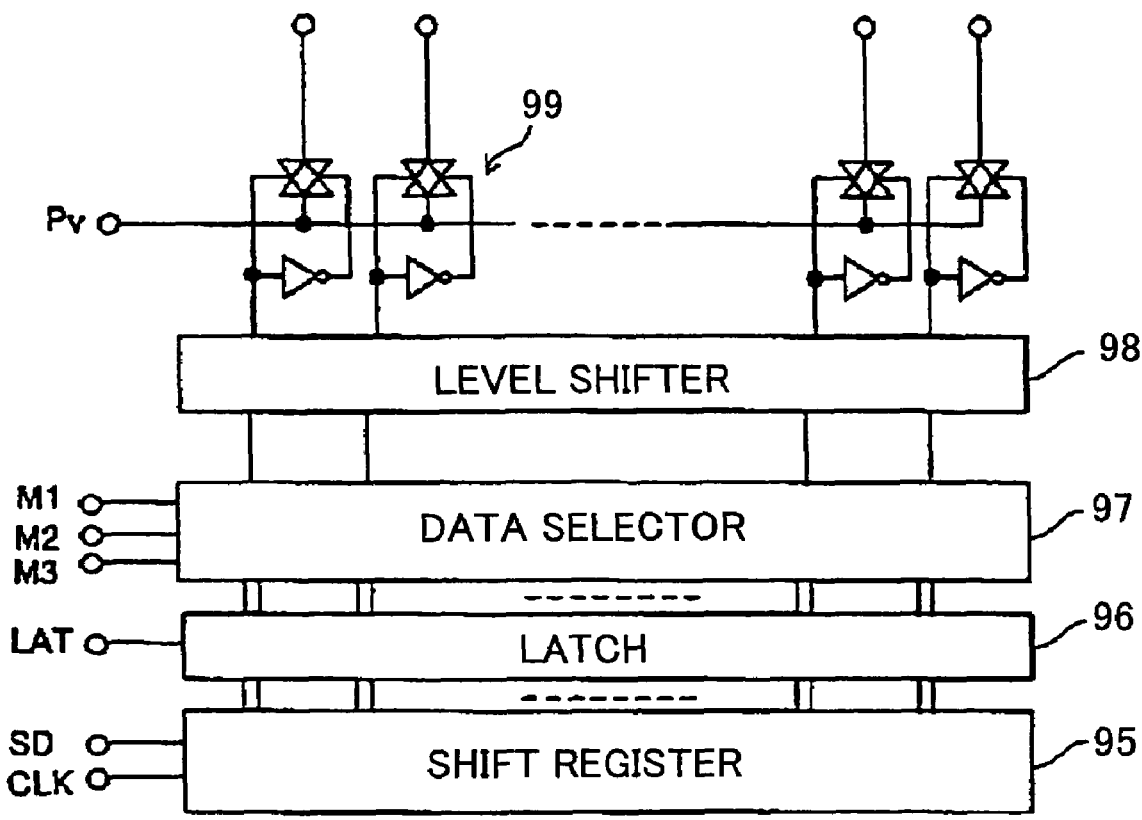
FIG. 15 is a system block diagram showing a head driving circuit.
Figure 16:
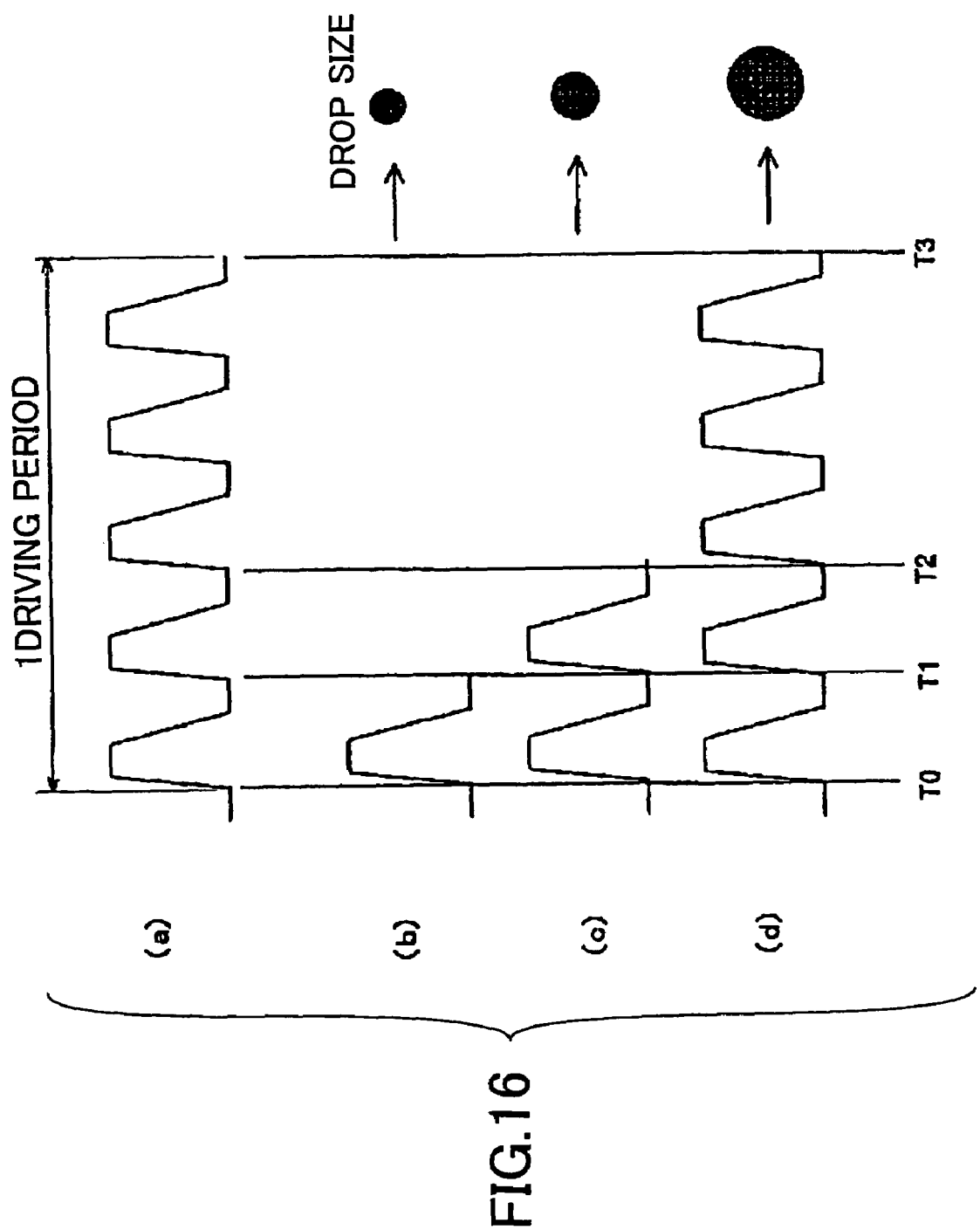
FIG. 16 is a timing diagram for explaining the operation of the driving and control section.

A description will be given of a driving and control section of the controller related to the driving and control of the recording heads 14 will now be described with reference to FIGS. 14 through 16. FIG. 14 is a system block diagram showing the driving and control section of the controller, and FIG. 15 is a system block diagram showing the head driving circuit 88. FIG. 16 is a timing diagram for explaining the operation of the driving and control section.

In FIG. 14, a main controller (CPU) 91 processes front data (dot data) which is received from the host unit 100 as print data, and carries out a vertical-to-horizontal conversion depending on the layout of the recording heads 14. In addition, the main controller 91 generates a 2-bit driving data SD which is required to control the ink drop to a large drop, medium drop and small drop (and no drop or no printing) in correspondence with three-valued (ternary) data, and supplies the 2-bit driving data SD to the head driving circuit (driver IC) 88. The main controller 91 also supplies to the head driving circuit 88 a clock signal CLK, a latch signal LAT, and driving waveform selection signals M1 through M3 for selecting the driving waveform in correspondence with the dot size (size of ink drop) to be formed. Furthermore, the main controller 91 reads driving waveform data stored in the ROM 81, and supplies the driving waveform data to the driving waveform generating circuit 87.

The driving waveform generating circuit 87 includes a D/A converter 92 for converting the driving waveform data received from the main controller 91 into an analog signal, an amplifier 93 for amplifying the output analog signal of the D/A converter 92 to the actual driving voltage, and a current amplifier 94 for amplifying an output of the amplifier 93 to a sufficiently high current capable of driving the recording heads 14. For example, the current amplifier 94 outputs a driving waveform Pv including a plurality of driving pulses within one driving period as shown in FIG. 16(a). The driving waveform Pv is supplied to the head driving circuit 88.

As shown in FIG. 15, the head driving circuit 88 includes a shift register 95 for inputting the driving data SD in response to the clock signal CLK from the main controller 91, a latch circuit 96 for latching the value of the shift register 95 in response to the latch signal LAT from the main controller 91, a data selector 97 for selecting one of the driving waveform selection signals (logic signals) M1 through M3 from the main controller 91 depending on a 1-bit driving data which is latched by the latch circuit 96, a level shifter 98 for shifting an output (logic signal) of the data selector 97 to a driving voltage level, and transmission gates 99 having ON and OFF states thereof controlled by an output of the level shifter 98. The transmission gates 99 receive the driving waveform Pv from the driving waveform generating circuit 87, and is connected to the piezoelectric elements 52 of the corresponding nozzles of the recording heads 14.

Accordingly, in the head driving circuit 88, the data selector selects one of the driving waveform selection signals M1 through M3 depending on the driving data SD, and shifts the selected driving waveform selection signal (logic signal) to the driving voltage level by the level shifter 98. The driving voltage level output from the level shifter 98 is applied to the gates of the transmission gates 99.

As a result, the transmission gates 99 are switched depending on the duration of the selected one of the driving waveform selection signals M1 through M3, and the driving pulses forming the driving waveform Pv are applied to each channel connected to the transmission gate 99 which is ON.

For example, in a case where the driving waveform Pv includes the plurality of driving pulses as shown in FIG. 16(a), each transmission gate 99 which becomes ON only from a time T0 to a time T1 outputs one driving pulse as shown in FIG. 16(b). Hence, when the driving pulse shown in FIG. 16(b) is applied to the piezoelectric element 52, a small ink drop is ejected from the corresponding nozzle. Similarly, each transmission gate 99 which becomes ON only from the time T0 to a time T2 outputs two driving pulses as shown in FIG. 16(c). Thus, when the driving pulse shown in FIG. 16(c) is applied to the piezoelectric element 52, a medium ink drop is ejected from the corresponding nozzle. Further, each transmission gate 99 which becomes ON from the time T0 to a time T3 outputs five driving pulses as shown in FIG. 16(d). Accordingly, when the driving pulse shown in FIG. 16(d) is applied to the piezoelectric element 52, a large ink drop is ejected from the corresponding nozzle.

Therefore, by generating the driving waveform including a plurality of driving pulses and selecting the number of driving pulses to be applied to the piezoelectric element 52, it is possible to generate the necessary driving waveforms for ejecting the small ink drop, medium ink drop and large ink drop from one driving waveform. Consequently, only one circuit is required to generate the driving waveform and only one signal line is required to supply this driving waveform. For this reason, it is possible to reduce the size of the circuit board and transmission lines and also reduce the cost thereof.

Next, a description will be given of an embodiment of the image processing apparatus according to the present invention, by referring to FIG. 17. FIG. 17 is a system block diagram showing the embodiment of the image processing apparatus. This embodiment of the image processing apparatus is formed by the host unit 100 which transfers the image data and the like to the ink-jet printer, and includes the printer driver 101, that is, an embodiment of the printer driver according to the present invention. The host unit 100 and the printer driver 101 use an embodiment of the threshold value matrix according to the present invention.

In the case of the embodiment of the image forming apparatus, that is, the ink-jet printer described above, the dot pattern to be actually recorded is received together with a print instruction or command from the host unit 100, and no means is provided within the image forming apparatus to generate the dot pattern to be recorded. Hence, the dot pattern data must be generated by the printer driver 101 which uses the embodiment of the threshold value matrix, and transfer the dot pattern data from the host unit 100 (the embodiment of the image processing apparatus) to the image forming apparatus (ink-jet printer).

As shown in FIG. 17, the printer driver 101 of the host unit 100 includes a color management module (CMM) process section 102, a black generate/under color reduction (BG/UCR) and γ-correction section 103, a zooming process section 104, and a threshold value matrix (table) 105. For example, the image data is generated by an application software of the host unit 100. The image data is processed by the CMM process section 102, the BG/UCR and γ-correction section 103 and the zooming process section 104, and the threshold value matrix (table) 105 is used to convert the multi-level image data into the dot pattern.

First, a description will be given of the method of creating the threshold value matrix for reproducing the gradation by a predetermined line keytone (dot layout pattern having an aligned property), by referring to FIGS. 18A through 29C.

When carrying out the image processing, if it is possible to realize a high resolution such that the resolution of the formed image exceeds the resolving power of the human eye, the picture quality is theoretically unaffected by the kind of process carried out. But in the case of the resolution of an order which can be recognized by the human eye, there is a possibility that the inconveniences generated by the process itself will become conspicuous to the human eye.

Figure 18A:
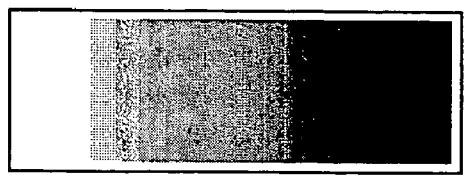
FIGS. 18A, 18B and 18C are diagrams for explaining a dot pattern after carrying out a Bayer type dither process and an error diffusion process with respect to an input image.
Figure 18B:
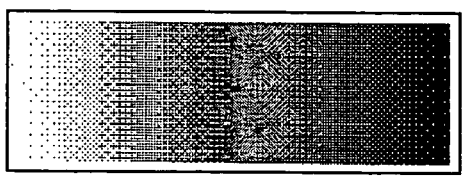
Figure 18C:
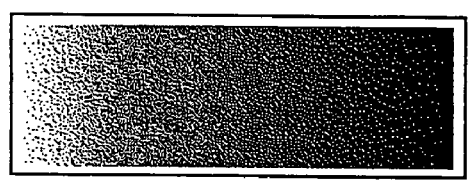

FIGS. 18A, 18B and 18C are diagrams for explaining a dot pattern after carrying out a Bayer type dither process and an error diffusion process with respect to an input image. FIGS. 18A through 18C show the dot patterns which are actually formed by the generally used halftone process for a low-resolution recording of approximately 300 dpi. FIG. 18B shows the output image after carrying out the Bayer type dither process with respect to the input image data shown in FIG. 18A. FIG. 18C shows the output image after further carrying out the error diffusion process.

Hence, in order to reproduce the data which should be represented by 1 pixel in multi-levels on the image forming apparatus not having a large number of reproducible gradation levels, it is necessary to make a pseudo gradation representation by the number of dots per unit area, that is, by the dot area ratio.

The two kinds of halftone processing methods described as examples of the pseudo gradation representation method, not only simply match the gradation levels and the area ratios, but arrange the dots approximately uniformly so that the dot layout is not biased, and adjust the dot layout so as to have a high-frequency characteristic which is less conspicuous to the human eye. When such a processing is applied to the high-resolution recording of 600 dpi or 1200 dpi, the dot layout pattern is virtually inconspicuous to the human eye, and it is possible to obtain an extremely satisfactory picture quality having no unevenness in the dot distribution.

On the other hand, when the low-resolution recording of 150 dpi or 300 dpi is carried out, the dot layout pattern becomes conspicuous to the human eye even after the adjusting process to make the dot layout pattern having the high-frequency characteristic. Since 1 pixel in the original image data is represented by a plurality of pixels by the pseudo gradation representation, a texture pattern not present in the original image appears in the output image.

Figure 19A:
FIGS. 19A and 19B are diagrams for explaining an image data after carrying out the Bayer type dither process with respect to an input image.
Figure 19B:

FIG. 18B shows such a texture pattern. In addition, when an input image data shown in FIG. 19A is output with a considerably low resolution of 72 dpi, the texture pattern becomes even more notable as shown in FIG. 19B. FIGS. 19A and 19B are diagrams for explaining the image data after carrying out the Bayer type dither process with respect to the input image. In FIG. 19B, a portion where the texture peculiar to the Bayer type dither process changes, and a portion where the dots are finely aligned and no texture appears, are mixed to thereby result in a considerably poor picture quality.

On the other hand, in the case of the error diffusion method, the dots are formed with a layout which appears random at first glance. This random dot layout is maintained for all of the gradation levels, and the texture will not change at the gradation levels and no fixed texture exists, as may be seen from FIG. 18C. Because no fixed texture exists, interferences with respect to mechanical deviations in the image forming apparatus are less likely to occur, and a high resolution characteristic is obtainable compared to the Bayer type dither process or the like since there is a certain degree of freedom of the dot layout.

Figure 20:
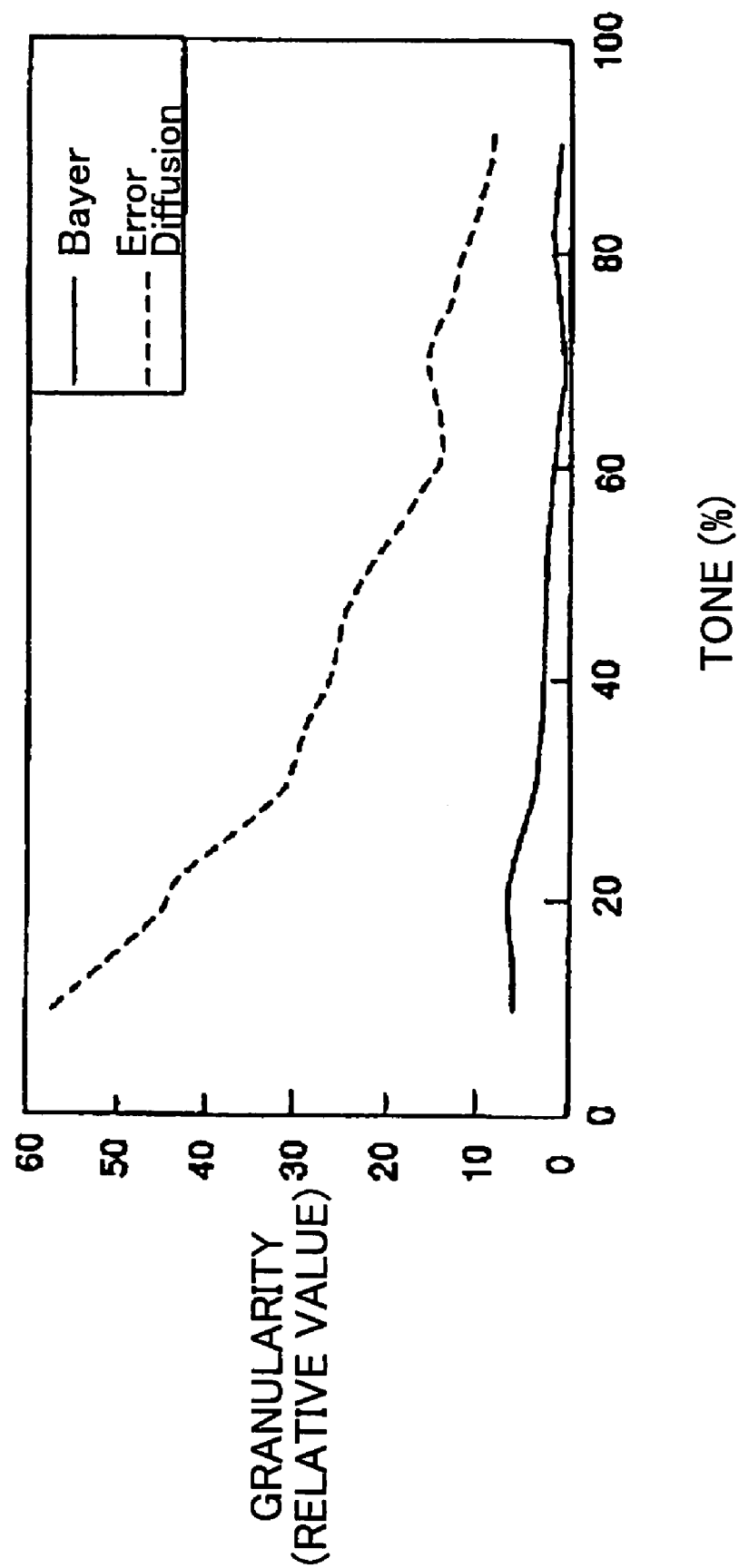
FIG. 20 is a diagram showing the granularity measured at tone intervals of 10% for the Bayer type dither pattern and the error diffusion pattern recorded at 300 dpi.

However, according to the error diffusion process, the granularity may be poor when compared to the Bayer type dither process, as shown in FIG. 20. FIG. 20 is a diagram showing the granularity measured at tone intervals of 10% for the Bayer type dither pattern and the error diffusion pattern recorded at 300 dpi. Hence, the random nature of the dot layout used in the error diffusion process, intended to obtain various advantageous effects, actually cause problems at the low resolution. In other words, at the low resolution, a conspicuous noise component is easily recognized in the case of the error diffusion process, and the aligned texture generated in the case of the Bayer type dither process tends to be better when a sensual evaluation is made.

Therefore, it may be understood from the above that the kind of texture pattern formed by the dot layout greatly affects the picture quality. In order to obtain a satisfactory picture quality at the low resolution using the two kinds of halftone processing methods, the present inventors found that it is necessary to form a dot layout pattern having good alignment and not to change the dot layout pattern or not to make the change in the dot layout pattern visible for each of the gradation levels.

In the embodiment of the threshold value matrix, the dot reproduction is made while constantly maintaining a predetermined line keytone (dot layout pattern having an aligned property) for all halftone levels, using only the dot layout pattern. Hence, it is possible to improve the picture quality when making a multi-level representation by a small number of values, on the order of approximately 1 bit to 3 bits, during the recording of the image forming apparatus at the low resolution. It is possible to obtain satisfactory recording (print) data particularly when applied to the ink-jet printer employing the dot size (diameter) modulation.

Figure 21:
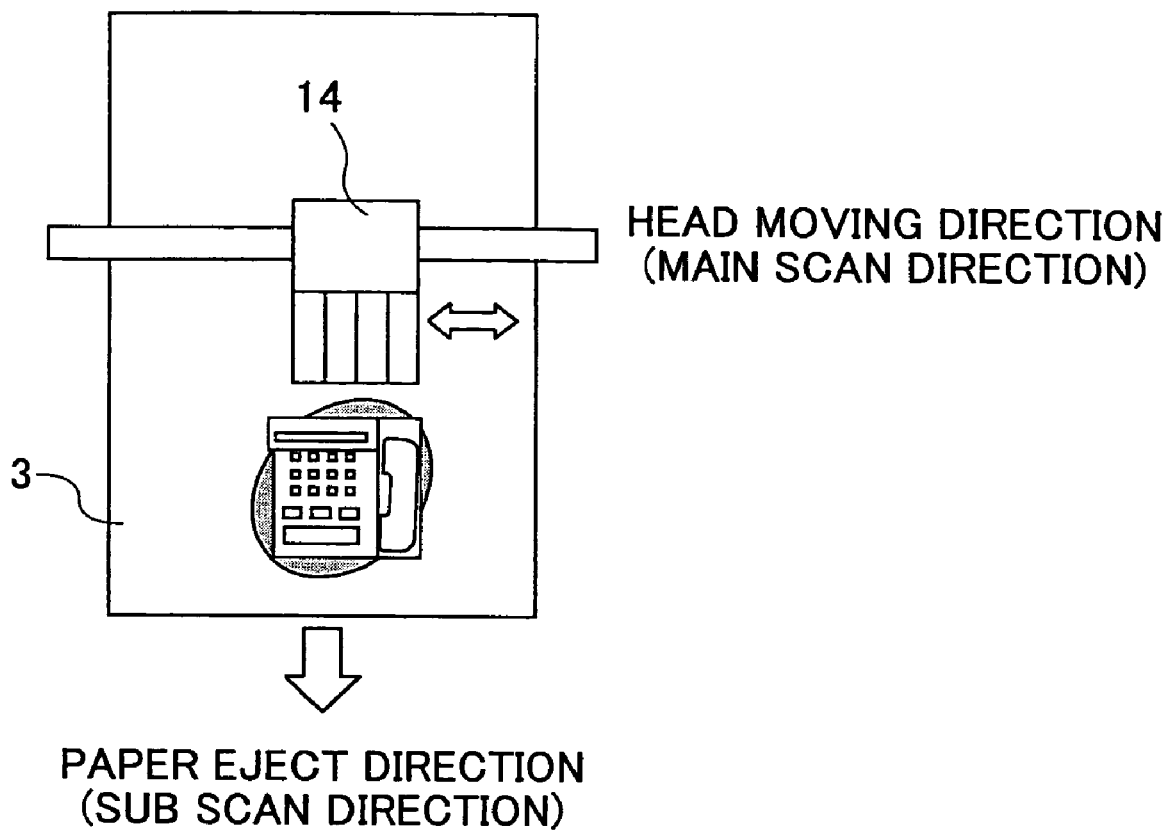
FIG. 21 is a diagram for explaining the effects of mechanical deviations in the ink-jet printer.

When considering the dot layout pattern having the aligned property (predetermined line keytone), it is always necessary to take into consideration the correlation with the mechanical deviations of the image forming apparatus. In other words, as in the case of the ink-jet printer described above, the recording unit including the recording heads 14 and the carriage 13 carries out the recording while moving in the main scanning direction depending on the transport of the paper 3 as shown in FIG. 21. FIG. 21 is a diagram for explaining the effects of the mechanical deviations in the ink-jet printer. In this case, if inconsistencies exist in the accuracy of the paper transport in the sub scanning direction and the head moving speed in the main scanning direction, an interference may occur with the predetermined line keytone and generate recognizable vertical and horizontal stripes.

FIGS. 22A and 22B are diagrams for explaining interference between the Bayer type dither pattern and the mechanical deviations of the ink-jet printer. FIG. 22B shows the interference which is generated when outputting one gradation pattern of the Bayer type dither pattern shown in FIG. 22A. It may be seen from FIG. 22B that when the keytone is aligned in the vertical and horizontal directions, a synchronization is easily occurs with deviations A and B in the main and sub scanning directions. Since the human eye is sensitive with respect to the 0-degree and 90-degree (180-degree and 270-degree) directions, it is desirable to avoid the keytone which easily aligns in the vertical and horizontal directions. However, as described above with respect to the error diffusion method, the random dot layout which is least likely to generate the interference is undesirable for the low resolution because the noise component is emphasized and become recognizable.

Accordingly, a dot layout pattern having an inclined keytone is desired, as shown in FIGS. 23A and 23B. FIGS. 23A and 23B are diagrams for explaining the dot layout pattern having the inclined keytone in an embodiment of a threshold value matrix according to the present invention. The same effects can be obtained with respect to deviations in both the main scanning direction and the sub scanning direction, by using a line-group keytone such as a 45-degree inclined keytone and a 135-degree inclined keytone, as shown in FIGS. 23A and 23B. Furthermore, since the human eye is slightly less sensitive with respect to the oblique direction, the inclined keytone tends to be less conspicuous than the vertical and horizontal keytones. But since the main purpose here is to align the keytone, and not to make the interference (which conventionally causes problems) inconspicuous, an advantageous characteristic can be derived therefrom.

The line-group keytones shown in FIGS. 23A and 23B are referred to as "line-group type dither" and used in electrophotography recording. In the electrophotography recording, a latent image is formed on a charged photoconductive body by a laser beam, and the latent image is visualized by a toner into a toner image. The toner image is transferred onto a recording medium such as paper. Hence, the dot size can be controlled in several stages by modulating the laser power, but the electrophotography recording is not suited for making the gradation representation using small dots because the toner adhering and transfer characteristics may deteriorate for small dots. Hence, an area modulated (AM) dither method which gradually forms the large dot by concentrating the dots as much as possible, is generally employed for the electrophotography recording.

The line-group type dither method is a kind of AM dither method. Although the line-group type dither method has directionality, it is advantageous in that the dots can be grown in a spiral manner and that the recording density (number of lines or line density) can be improved compared to the concentration type dither method.

Figures 24A, 24B:
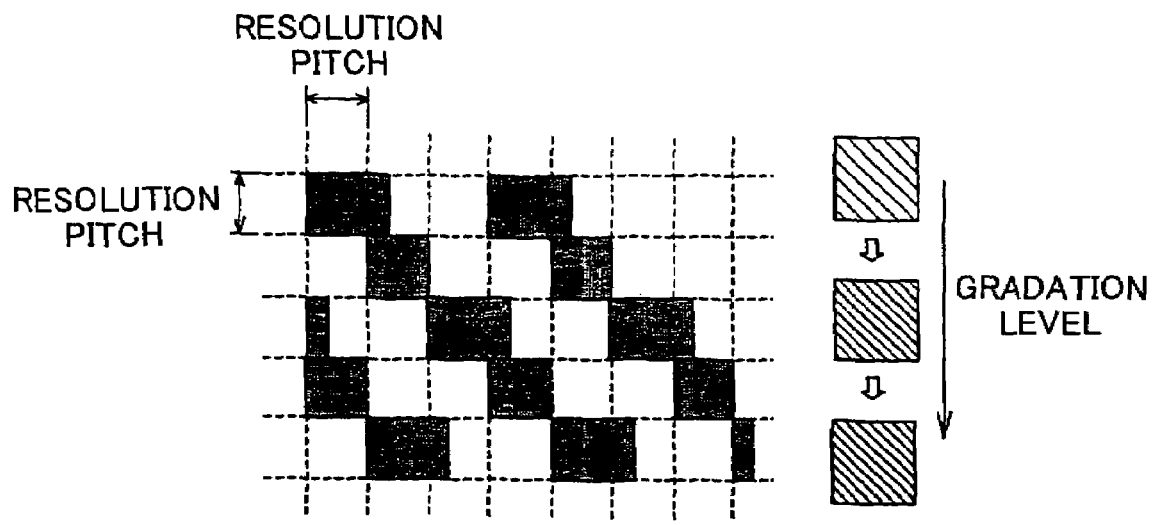
FIGS. 24A and 24B are diagrams for explaining the dot pattern of a line-group keytone used in electrophotography recording and the change in keytone of the gradation level.

However, when the line-group type dither method used in the electrophotography recording is applied as it is to the ink-jet recording or other recording techniques other than the electrophotography recording, the keytone will not be aligned appropriately. In other words, in the case of the electrophotography recording, it is possible to adjust not only the dot size but also the dot forming position, as may be seen from FIG. 24A. Hence, as may be seen from FIG. 24B, no matter how the dots are arranged, that is, no matter how the gradation level changes, it is possible to represent the gradation levels without destroying the shape of the oblique line. FIGS. 24A and 24B are diagrams for explaining the dot pattern of a line-group keytone used in electrophotography recording and the change in keytone of the gradation level.

Figures 25A, 25B:
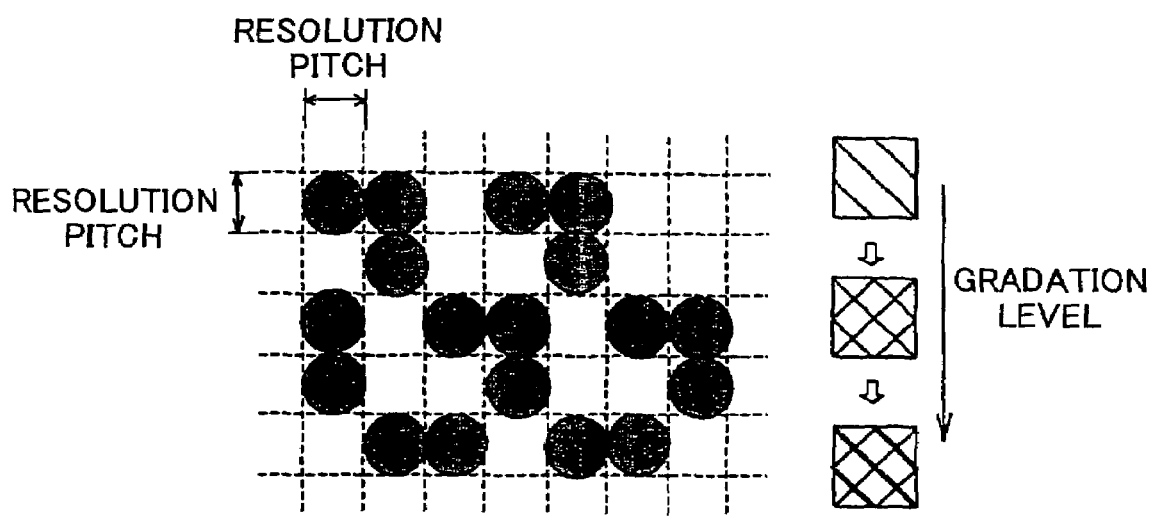
FIGS. 25A and 25B are diagrams for explaining the dot pattern of the line-group keytone applied to ink-jet recording and the change in keytone of the gradation level.

On the other hand, when the line-group type dither method used in the electrophotography recording is applied as it is to the ink-jet recording, the dot forming positions are fixed to the pitch determined by the recording resolution, as shown in FIG. 25A. For this reason, the keytone changes even when the number of dots slightly increases, as shown in FIG. 25B, and it is impossible to achieve the original intention which is to realize a processing method which does not change the keytone or does not make the change in keytone conspicuous. FIGS. 25A and 25B are diagrams for explaining the dot pattern of the line-group keytone applied to the ink-jet recording and the change in keytone of the gradation level.

Particularly in the case of the general dither process, the same mask is tiled into square shapes and used, in order to simplify the processing mechanism and achieve high-speed processing at a low cost. Hence, even if the number of dots increases by 1 dot, this increase is recognized as a pattern which is aligned vertically and horizontally with the tiling period.

For example, when a 4×4 dither mask shown in FIG. 26A is used to carry out the tiling as shown in FIG. 26B, the dots become aligned as a whole, vertically and horizontally. As a result, a lattice keytone is generated as shown in FIG. 26C. FIGS. 26A, 26B and 26C are diagrams for explaining the keytone formed by tiling the dither mask.

Accordingly, in order to maintain the group-line keytone and to avoid a change in the keytone by this tiling, this embodiment generates three or more dots simultaneously per single gradation level.

In other words, in a case where the reproduction is made by the inclined line-group keytone, when a mask having 1 dot per single gradation level as shown in FIG. 27A is tiled as shown in FIG. 27B, a lattice keytone which is aligned vertically and horizontally is obtained as shown in FIG. 27C. FIGS. 27A, 27B and 27C are diagrams for explaining the tiling and the keytone for the case where the mask has 1 dot per gradation level.

In addition, in a case where the reproduction is made by the inclined line-group keytone, when a mask (having obliquely arrange dot layout) having 2 dots per single gradation level as shown in FIG. 28A is tiled as shown in FIG. 28B, an inclined keytone which is aligned obliquely is obtained as shown in FIG. 28C. In FIG. 28C, the inclined keytone the 45-degree alignment and the 135-degree alignment which intersect. FIGS. 28A, 28B and 28C are diagrams for explaining the tiling and the keytone for the case where the mask has 2 dots per gradation level.

On the other hand, in a case where the reproduction is made by the inclined line-group keytone, when a mask having 3 dots per single gradation level as shown in FIG. 29A is tiled as shown in FIG. 29B, an inclined keytone which is aligned only in one oblique direction is obtained as shown in FIG. 29C. FIGS. 29A, 29B and 29C are diagrams for explaining the tiling and the keytone for a case where the mask has 3 dots per gradation level. A similar inclined keytone is obtained when the mask has more than 3 dots per single gradation level.

In this case, simultaneously forming 3 or more dots per single gradation level, requires a mask size which is 3×3=9 times or greater in order to obtain the same capability of reproducing the gradation levels. This value of 9 times or greater is small compared to the size of the buffer memory or the like required for the error diffusion process. Unless an extremely large mask is used as a reference, this size of the mask size will not decrease the processing speed or increase the cost. Of course, in order to achieve a high-speed processing it is desirable that the vertical and horizontal sizes of the mask can easily be processed by a computer. In other words, it is desirable to make the mask size a multiple of 8, so that odds are not generated upon development into a memory.

Next, a description will be given of an enlargement of the mask size, by referring to FIGS. 30A through 30F. FIGS. 30A through 30F are diagrams for explaining division of a basic matrix into sub matrixes.

When a reference mask shown in FIG. 30A which has the inclined line-group keytone is used as a reference to form a mask shown in FIG. 30B for the case where four dots are simultaneously generated, each cell of the reference mask shown in FIG. 30C is further divided into smaller sub matrixes as shown in FIGS. 30D and 30E so as to obtain the necessary number of gradation levels. In this case, by making the sub matrixes similar figures to the reference mask so as to have the inclined line-group keytone, it is possible to prevent a pattern which destroys the keytone from being generated.

For example, the 3×3 sub matrix shown in FIG. 30D can represent 36 gradation levels. In addition, the 4×4 sub matrix shown in FIG. 30E can represent 64 gradation levels. It is possible to use a 2×2 sub matrix shown in FIG. 30F, but a checkerboard pattern keytone is generated during the process of representing the gradation levels when the 2×2 sub matrix is used. For this reason, this embodiment sets a minimum unit of the sub matrix to be a 3×3 inclined line-group mask.

By using the sub matrixes described above, it is possible to suppress generation of another keytone which would destroy the inclined line-group keytone.

Next, a description will be given of a method of preventing the keytone from being lost (or disappearing) in order to eliminate a change in the keytone or, to make the change in the keytone not easily recognizable. As described above with respect to the inclined keytone, there is no need to emphasize the keytone more than necessary, but a sudden loss (or disappearance) of the keytone will be recognized as a change in the keytone. For this reason, at a gradation level where the keytone is easily lost (or disappears), it is preferable to create the keytone.

As the density of the dots increases to a certain extent, the dot pattern itself may represent a keytone, but the keytone may not be recognizable by the human eye. Such a situation occurs when the spatial frequency of the dot pattern becomes high, and easily occurs particularly in the case of the plural-level process which uses dots having a plurality of sizes.

Figure 31A:
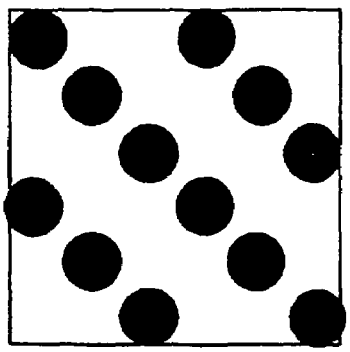
FIGS. 31A and 31B are diagrams for explaining a dot pattern from which the keytone is recognizable.
Figure 32A:
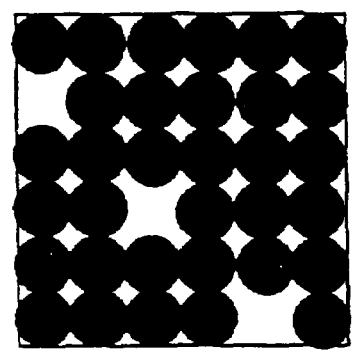
FIGS. 32A and 32B are diagrams for explaining a dot pattern from which the keytone is not recognizable.
Figure 31B:
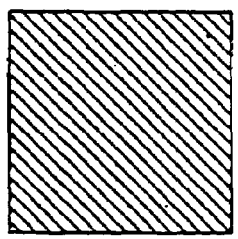
Figure 32B:

In other words, in a case where the number of dots is small as shown in FIG. 31A, it is possible to visually recognize the keytone as may be seen from FIG. 31B. However, as the number of dots becomes large as shown in FIG. 32A, it becomes difficult to visually recognize the keytone as may be seen from FIG. 32B. FIGS. 31A and 31B are diagrams for explaining the dot pattern from which the keytone is recognizable, and FIGS. 32A and 32B are diagrams for explaining the dot pattern from which the keytone is not recognizable. The keytone is lost for the gradation levels at which the space is filled to a certain extent by the dots or, for the gradation level at which all coordinates are filled by the dots, that is, the space is completely filled by the dots. Between a case where "a dot exists within a space" and a case where "a gap exists within the dots", the brightness becomes lower for the latter case and is thus difficult to visually recognize by the human eye. Furthermore, the actual recorded image is affected by deformation of the dots caused by the dot gain.

Figure 33A:
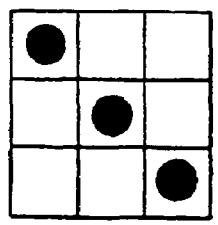
FIGS. 33A through 33D are diagrams for explaining the loss of keytone at a dot size switching part.
Figure 33B:
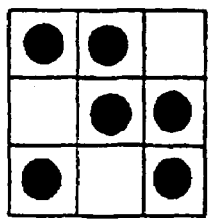
Figure 33C:
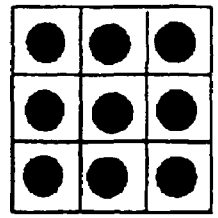
Figure 33D:
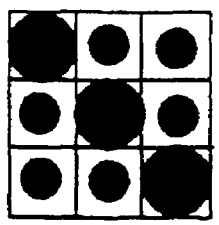

According to the plural-level process in which gradation reproducing range (or section) switches for each dot size, the keytone is lost for the gradation level at which the space is completely filled by the dots, immediately before the switching of the dot size takes place, that is, when the space is completely filled by the dots of the previous stage. The keytone is not lost for the binarization process because no switching point exists for the binarization process. Hence, the keytone exists for cases shown in FIGS. 33A and 33B where the number of dots is small, but the keytone is lost for a case shown in FIG. 33C where the space is completely filled by small dots. The keytone reappears as shown in FIG. 33D when the dot size is changed from small dots to medium dots. FIGS. 33A through 33D are diagrams for explaining the loss of the keytone at the dot size switching part.

FIGS. 34A through 34C are diagrams for explaining the loss of keytone at the dot size switching part for a particular case. FIG. 34A shows a mask for small dots, FIG. 34B shows a mask for medium dots, and FIG. 34C shows a mask for large dots. For example, if the keytone is lost at a threshold value "73" of the mask for small dots and at a threshold value "182" of the mask for medium dots, and a first threshold value after the switching of the dot size is "80" in the case of the mask for the medium dots and "187" in the case of the mask for the large dots, the loss of the keytone is generated by the switching of the dot size.

Hence, in this embodiment, when the loss of the keytone is independently generated for a dot pattern, this dot pattern is not used, by making the threshold values of this dot pattern identical to those of the immediately subsequent dot pattern. As a result, the dot pattern which independently generates the loss of the keytone is skipped, so that the loss of the keytone is not generated thereby.

In the gradation level range where the loss of the keytone easily occurs, only the odd numbered (ith, where i is an odd number) threshold values are arranged in the mask, and the even numbered (jth, where j is an even number) threshold values are replaced by the next odd numbered threshold values, so that the even numbered dot outputs are always skipped. By designing the mask so that one side of the mask is always a multiple of 8, and arranging only the odd numbered threshold values in the mask, it is possible create incomplete sets of dots to intentionally emphasize the keytone.

Furthermore, in the dot size switching part of the plural-level process, the first threshold value after the switching of the dot size is allocated to the position where the threshold level at which the loss of the keytone is generated is arranged, so as to skip the point where the loss of the keytone is generated. For example, a maximum threshold value of a mask for small dots shown in FIG. 35A and a minimum threshold value of a mask for medium dots shown in FIG. 35B are both set to "80", and a maximum threshold value of the mask for medium dots shown in FIG. 35B and a minimum threshold value of a mask for large dots shown in FIG. 35C are both set to "187", so as to prevent the loss of the keytone at the dot size switching part. FIGS. 35A through 35C are diagrams for explaining the process carried out with respect to the loss of keytone at the dot size switching part.

By carrying out the above described process, the number of gradation levels may again become insufficient. But in this case, a further stage of sub matrixes may be set so as to compensate for the insufficient number of gradation levels.

Figure 36:
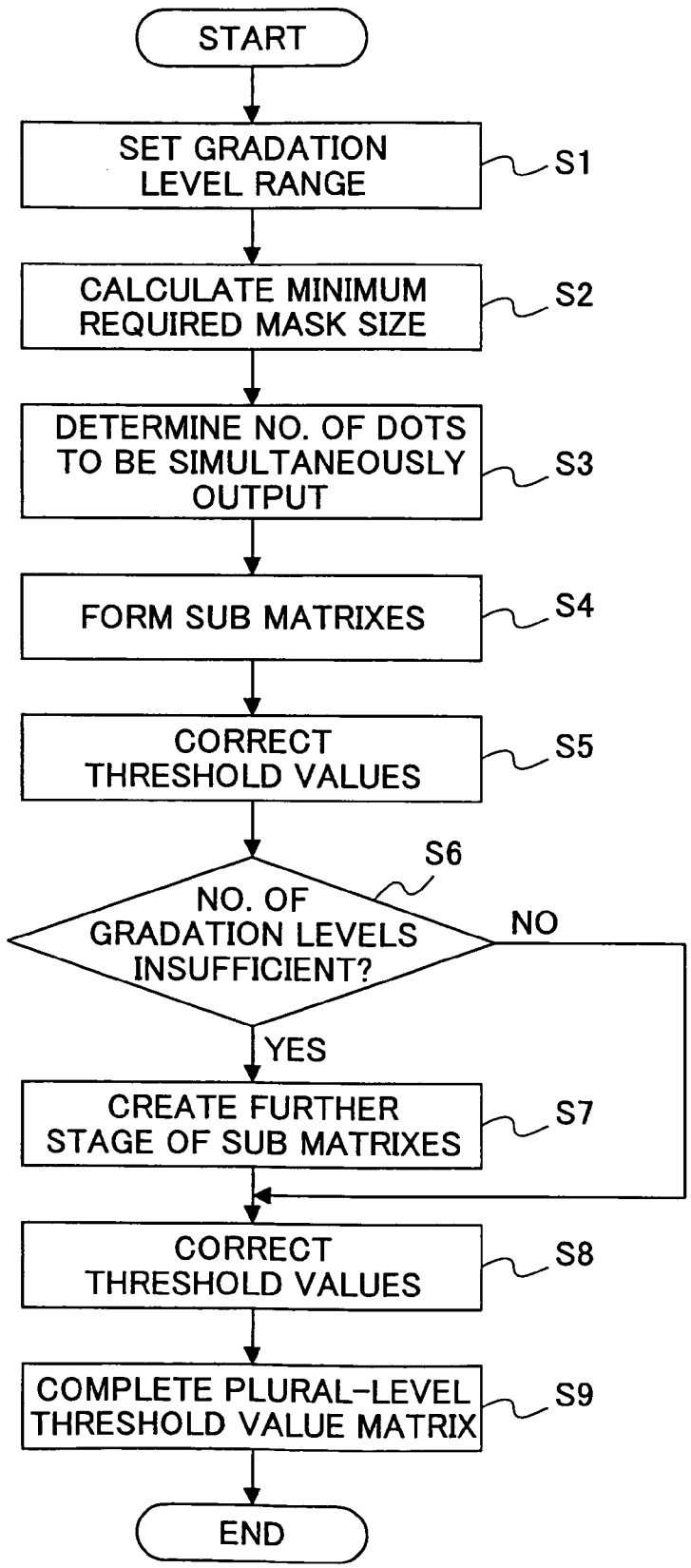
FIG. 36 is a diagram for explaining a method of creating the threshold value matrix.

FIG. 36 is a diagram for explaining a method of creating this embodiment of the threshold value matrix. When the process shown in FIG. 36 starts, a step S1 sets a gradation level range which is to be represented by the dots of each of the sizes in the plural-level process. A step S2 calculates a minimum required mask size for making a gradation representation in the set gradation level range. A step S3 determines, from the calculated mask size, a number of dots to be simultaneously output per gradation level.

A step S4 forms sub matrixes for compensating for the reduction in the number of gradation levels caused by the simultaneous output of the dots, while taking into consideration a minimum unit of the sub matrixes. A step S5 corrects the threshold values in a vicinity of the gradation level where the loss of the keytone occurs. A step S6 decides whether or not the number of gradation levels becomes insufficient as a result of correcting the threshold values.

If the decision result in the step S6 is YES, a step S7 creates a further stage of sub matrixes. If the decision result in the step S6 is NO or after the step S7, a step S8 corrects the threshold values corresponding to the switching point of the threshold value matrixes for the dots of each of the sizes. Then, a step S9 completes the plural-level threshold value matrix for the low resolution, and the process ends.

By using the plural-level threshold value matrix (or bi-level threshold value matrix) which is created in the above described manner, it is possible to obtain a satisfactory picture quality even in the case of an image forming apparatus or an image recording apparatus which has a low resolution, and also in the case of an image forming apparatus or an image recording apparatus which can only select a low resolution in order to achieve a high-speed recording.

This embodiment of the threshold value matrix may be stored in the printer driver 101 of the host unit 100 shown in FIG. 13, and the plural-level process may be carried out by software.

In this case, the printer driver 101 of the host unit 100 discriminates the direction of the paper (horizontal or vertical layout to be used on the paper), the writing direction (horizontal or vertical writing in the case of Japanese) and the like, based on the input image data or based on specified output setting information, and carries out a process of rotating the threshold value matrixes so that the direction of the keytone always becomes constant. In other words, the threshold value matrix table is rotated so that the direction of the keytone becomes the same for a portrait mode which uses the paper vertically so that the longer side is vertical and a landscape mode which uses the paper horizontally so that the longer side is horizontal.

In the embodiment described above, the threshold value matrix is held in the form of a table in the printer driver 101 of the host unit 100. However, it is possible to employ a structure shown in FIG. 37.

Figure 37:
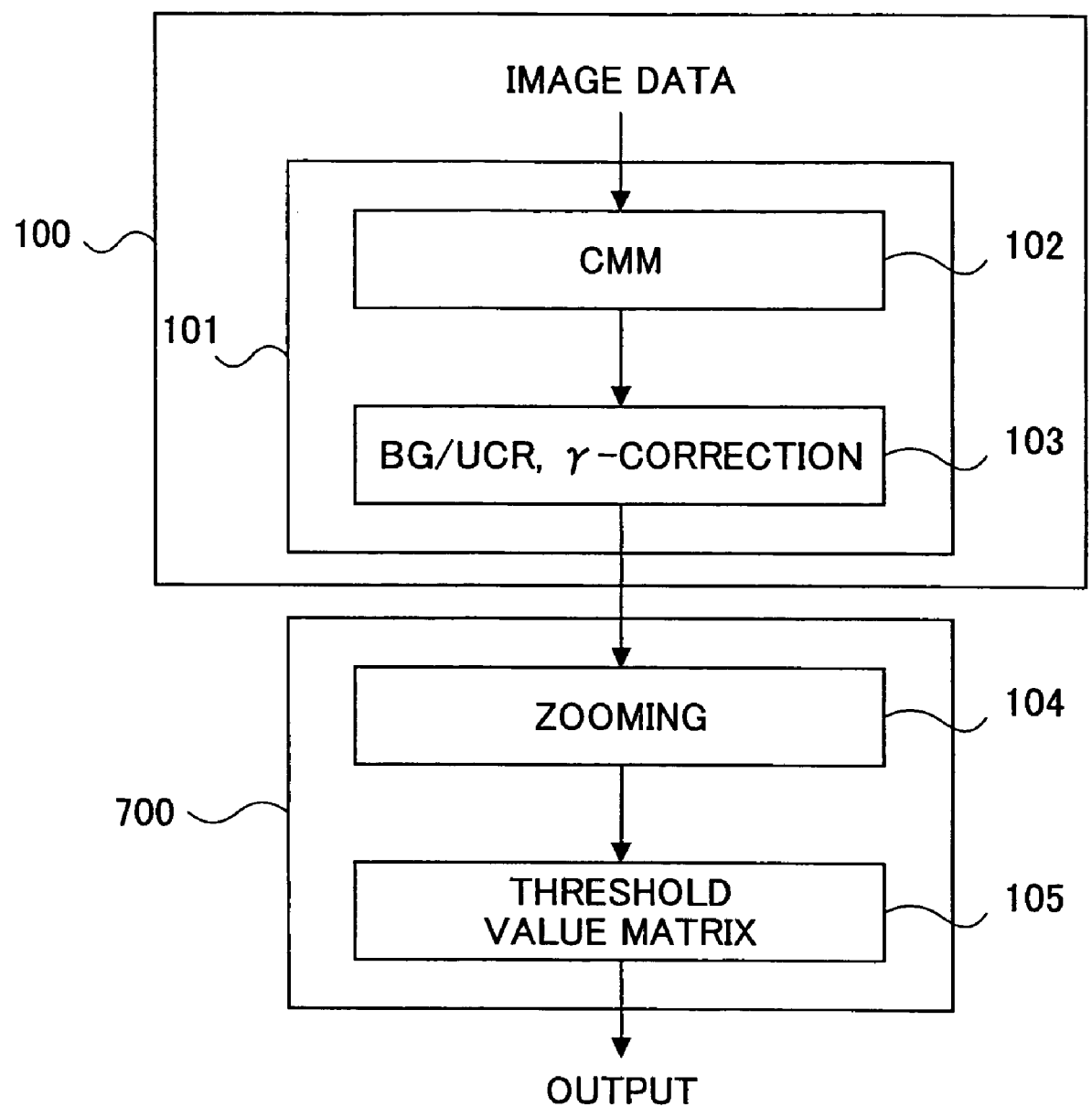
FIG. 37 is a system block diagram showing another embodiment of the image forming apparatus according to the present invention.

FIG. 37 is a system block diagram showing another embodiment of the image forming apparatus according to the present invention. In the host unit 100 shown in FIG. 37, the printer driver 101 includes only a CMM process section 102 and a BG/UCR and γ-correction section 103, which process the image data from application software or the like executed by the host computer 100. A zooming process section 104 and a threshold value matrix (table) 105 are provided in a controller of an ink-jet printer 700. The threshold value matrix (table) 105 is formed by a ROM or the like which stores the threshold value matrix of the present invention. Hence, the conversion of the dot layout is made in the ink-jet printer 700 in this case. But regardless of whether the conversion of the dot layout is made in the host unit 100 or the ink-jet printer 700, it is possible to make a 1:1 comparison process with respect to the input image data, thereby enabling image processing at a high speed and a low cost.

In the embodiment described above, the present invention is applied in particular to the host unit and the ink-jet printer (image forming apparatus). However, the present invention is similarly applicable to any type of image forming apparatus which forms an image by dots, that is, forms the image by dot representation. Hence, the present invention is applicable to thermal transfer type image forming apparatuses (printers), for example. The present invention is also applicable to electrophotography type image forming apparatuses such as laser printers and LED printers.

Figure 38:
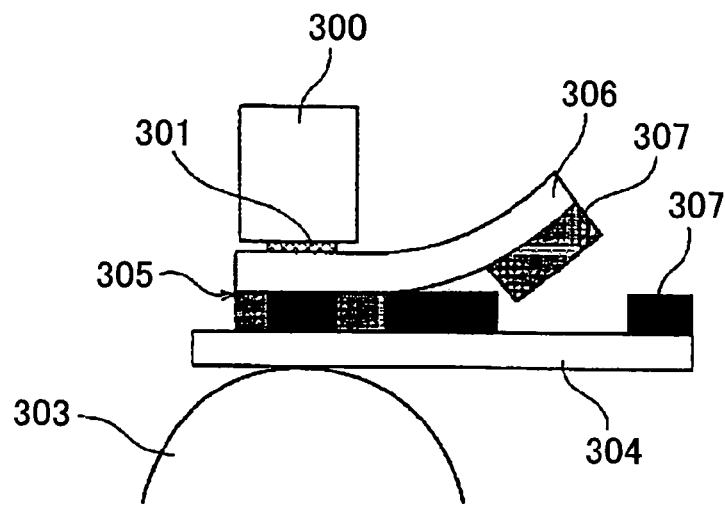
FIG. 38 is a diagram generally showing a thermal transfer type image forming apparatus.

FIG. 38 is a diagram generally showing a thermal transfer type image forming apparatus. As shown in FIG. 38, a paper 304 and an ink sheet 305 are transported between a pressure roller 303 and a thermal head 300 which is provided with a heating element 301. By driving the heating element 301 of the thermal head 300, a wax layer 307 in a predetermined region of a base layer 306 of the ink sheet 105 is transferred onto the paper 304 to thereby form an image on the paper 304.

Figure 39:
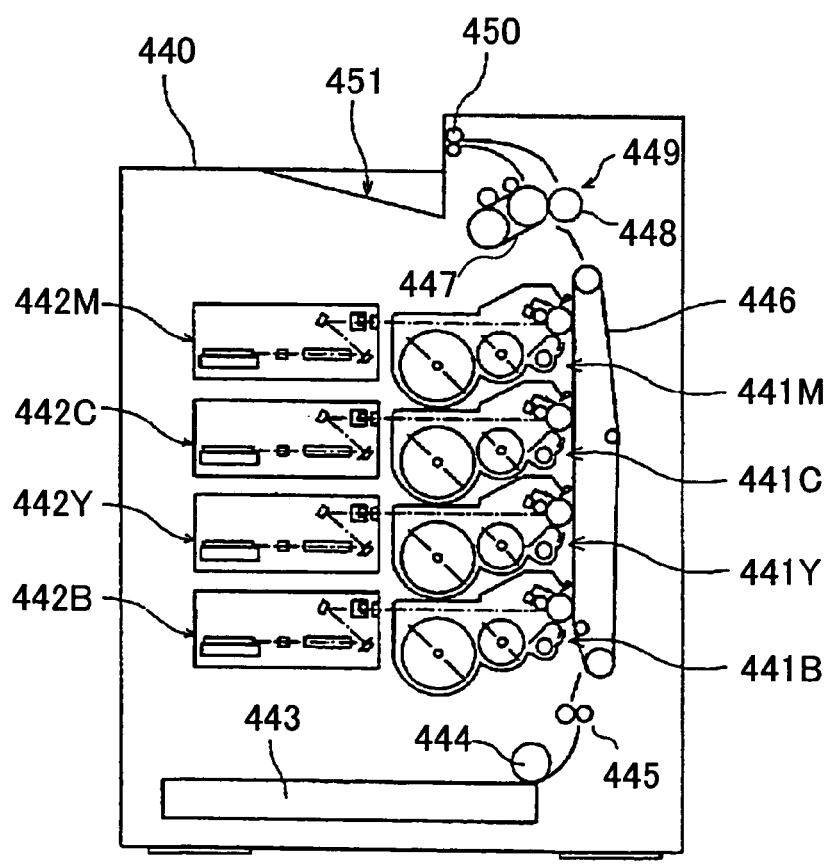
FIG. 39 is a diagram generally showing an electrophotography type image forming apparatus.
Figure 40:
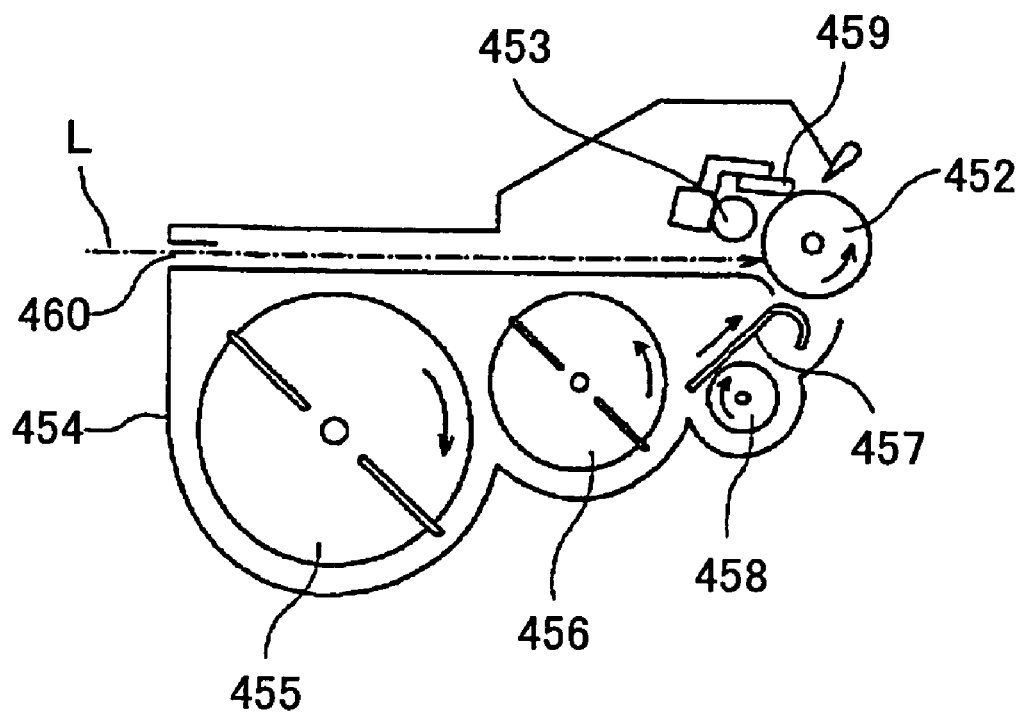
FIG. 40 is a diagram generally showing a process cartridge of the electrophotography type image forming apparatus.

FIG. 39 is a diagram generally showing an electrophotography type image forming apparatus. FIG. 40 is a diagram generally showing a process cartridge of the electrophotography type image forming apparatus.

An image forming apparatus 440 shown in FIG. 39 is a kind of laser printer which forms a full color image using four basic colors of magenta (M), cyan (C), yellow (Y) and black (Bk). The image forming apparatus 440 generally includes four optical write (recording) units 442M, 442C, 442Y and 442Bk for emitting laser beams depending on image signals of the corresponding colors M, C, Y and Bk, four process cartridges 441M, 441C, 441Y and 441Bk for forming images in colors M, C, Y and Bk, and a paper supply cassette 443 which accommodates recording paper on which the images are to be transferred. A paper supply roller 444 supplies the recording paper from the paper supply cassette 443, and a resist roller 445 transports the recording paper at a predetermined timing. A transfer belt 446 transports the recording paper to a transfer portion of each of the process cartridges 441M, 441C, 441Y and 441Bk. A fixing unit 449 fixes the image transferred onto the recording paper. A paper eject roller 450 ejects the recording paper after the fixing onto a paper eject tray 451.

The four process cartridges 441M, 441C, 441Y and 441Bk have the same structure shown in FIG. 40. As shown in FIG. 40, the process cartridge integrally includes within a casing a drum-shaped photoconductive body 452 which is provided as an image bearing member, a charging roller 453, a developing unit 454, and a cleaning blade 459.

A toner supply roller, a charging roller, an electrostatic transport plate 457 and a toner return roller 458 are provided within the developing unit 454, and toner of a corresponding color is accommodated within the developing unit 454. In addition, a slit 460 through which the laser beam from the corresponding optical write unit enters is provided in a rear surface of the process cartridge 441.

Each of the optical write units 442M, 442C, 442Y and 442Bk includes a semiconductor laser, a collimator lens, an optical deflector such as a polygonal mirror, and a scanning and imaging optical system, and emits a laser beam which is modulated depending on the image data of the corresponding color input from the host unit (image processing apparatus) such as a personal computer provided externally to the image forming apparatus. The laser beams from the optical write units 442M, 442C, 442Y and 442Bk scan the photoconductive bodies 452 of the corresponding process cartridges 441M, 441C, 441Y and 441Bk, so as to write electrostatic latent images on the photoconductive bodies 452.

When the image formation starts, the photoconductive body 452 of each of the process cartridges 441M, 441C, 441Y and 441Bk is uniformly charged by the charging roller 453, and the laser beam from each of the optical write units 442M, 442C, 442Y and 442Bk scans the photoconductive body 452 of the corresponding one of the process cartridges 441M, 441C, 441Y and 441Bk, so as to write electrostatic latent image on the photoconductive body 452. The electrostatic latent image formed on the photoconductive body 452 is developed and visualized into a toner image by the toner of the corresponding color electrostatically transported by the electrostatic transport plate 457 of the developing unit 454. A pulse-shaped developing bias is applied between confronting portions of the photoconductive body 452 and the electrostatic transport plate 457 for the developing and visualization of the electrostatic latent image into the toner image. The toner not used for the developing is transported by the electrostatic transport plate 457 and returned by the toner return roller 458.

The recording paper within the paper supply cassette 443 is supplied by the paper supply roller 444 in synchronism with each color image formation at the process cartridges 441M, 441C, 441Y and 441Bk, and is transported towards the transfer belt 446 by the resist roller 445 at a predetermined timing. The recording paper is carried by the transfer belt 446 and successively transported to pass by the photoconductive body 452 of each of the process cartridges 441M, 441C, 441Y and 441Bk. Hence, the toner images of each of the colors Bk, Y, C and M are successively transferred onto the recording paper in an overlapping manner. The recording paper having the toner images of the four colors transferred thereon in the overlapping manner is transported to the fixing unit 449 which includes a fixing belt 447 and a pressure roller 448, and a full color toner image is fixed on the recording paper. The recording paper is then ejected onto the paper eject tray 451 by the paper eject roller 450.

Figure 41:
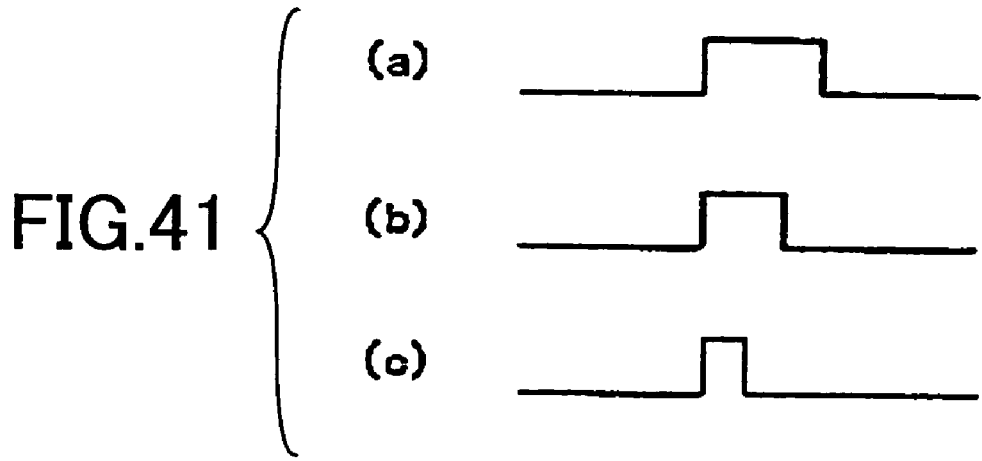
FIG. 41 is a timing diagram for explaining a dot size change in the electrophotography type image forming apparatus.

FIG. 41 is a timing diagram for explaining a dot size change in this electrophotography type image forming apparatus. FIG. 41(a), FIG. 41(b) and FIG. 41(c) show various ON and OFF times of the laser beam which is emitted from each of the optical write units 442M, 442C, 442Y and 442Bk. It is possible to change the dot size formed on the photoconductive body 452 by changing the ON and OFF times of the laser beam as shown.

Of course, the structure of the recording head of the ink-jet printer described above is not limited to that of the described embodiment, and various other structures may be used, such as a thermal type ink-jet head which uses a heating resistor and an electrostatic type ink-jet head which uses a vibration plate and an electrode. In addition, although the present invention is applied to the image forming apparatus in the described embodiments, it is also possible to similarly apply the present invention for the image processing and gradation representation when outputting image data to an image display apparatus.

Further, the present invention is not limited to these embodiments, but various variations and modifications may be made without departing from the scope of the present invention.

The invention claimed is:

1. A computer-readable storage medium tangibly embodying a program of instructions executable by a computer to generate a threshold value matrix, said program comprising:
   a threshold value obtaining part configured for obtaining threshold values used for making a dot representation solely by a dot pattern while maintaining an identical keytone for all halftone levels; and
   a generation part configured for generating the threshold value matrix from the threshold value,
   wherein the threshold value matrix is used to convert a multi-level image data into a plural-level image data which represents a dot pattern by a smaller number of gradation levels than the multi-level image data.

2. The computer-readable storage medium as claimed in claim 1, wherein said program further comprising:
   a sub matrix obtaining part configured for obtaining a plurality of sub matrixes; and
   a basic matrix obtaining part configured for obtaining a basic matrix for combining the sub matrixes,
   said sub matrixes and said basic matrix having similar line-group keytones.

3. The computer-readable storage medium as claimed in claim 2, wherein at least said sub matrixes have a size of 3×3 and an inclined line-group keytone.

4. The computer-readable storage medium as claimed in any of claims 1 to 3, wherein the threshold value matrix is used to always simultaneously generate three or more dots per gradation level.

5. The computer-readable storage medium as claimed in claim 1, wherein a threshold value immediately before switching a dot size has a value identical to a first threshold value for a dot size of a next stage.

6. The computer-readable storage medium as claimed in claim 1, wherein the threshold value matrix excludes a matrix which independently generates a dense dot pattern for which a keynote is not visually recognizable by human eye.

7. The computer-readable storage medium as claimed in claim 1, wherein only odd numbered threshold values are used to form an incomplete set of dots at a gradation level where a keytone is easily lost due to increased dot density.

8. The computer-readable storage medium as claimed in claim 1, wherein one side of the threshold value matrix is always a multiple of eight.

9. An image processing apparatus comprising:
   a processing section carrying out a plural-level process with respect to a multi-level image data to output a plural-level image data which represents a dot pattern by a smaller number of gradation levels than the multi-level image data by use of a threshold value matrix; and a holding section holding said threshold value matrix which includes threshold values which are used for making a dot representation solely by a dot pattern while maintaining an identical keytone for all halftone levels.

10. The image processing apparatus as claimed in claim 9, wherein said processing section uses the threshold value matrix by rotating the threshold value matrix based on the multi-level image data or specified output setting information.

11. The image processing apparatus as claimed in claim 10, wherein said processing section rotates the threshold value matrix so that directions of keytones are identical between a portrait mode which uses an output picture vertically so that a longer side of the picture is vertical and a landscape mode which uses the output picture horizontally so that the longer side of the picture is horizontal.

12. The image processing apparatus as claimed in any of claims 9 to 11, wherein said threshold value matrix comprises a plurality of sub matrixes, and a basic matrix for combining the sub matrixes, said sub matrixes and said basic matrix having similar line-group keytones.

13. The image processing apparatus as claimed in claim 12, wherein at least said sub matrixes have a size of 3×3 and an inclined line-group keytone.

14. The image processing apparatus as claimed in claim 9, wherein said holding section holds a threshold value matrix which is used to always simultaneously generate three or more dots per gradation level.

15. The image processing apparatus as claimed in claim 9, wherein a threshold value immediately before switching a dot size has a value identical to a first threshold value for a dot size of a next stage, within the threshold value matrix.

16. The image processing apparatus as claimed in claim 9, wherein said holding section holds the threshold value matrix excluding a matrix which independently generates a dense dot pattern for which a keytone is not visually recognizable by human eye.

17. The image processing apparatus as claimed in claim 9, wherein said holding section holds the threshold value matrix in which only odd numbered threshold values are used to form an incomplete set of dots at a gradation level where a keytone is easily lost due to increased dot density.

18. The image processing apparatus as claimed in claim 9, wherein one side of the threshold value matrix is always a multiple of eight.

19. A computer-readable storage medium tangibly embodying a printer driver program executable by a computer to supply an output image data to an image forming apparatus which forms an image from a plurality of dots, said printer driver program comprising:

a processing part configured for carrying our a plural-level process with respect to a multi-level image data to output, as the output image data, a plural-level image data which represents a dot pattern by a smaller number of gradation levels than the multi-level image data by use of a threshold value matrix; and a storing part configured for storing in a table said threshold value matrix which includes threshold values which are used for making a dot representation solely by a dot pattern while maintaining an identical keytone for all halftone levels.

20. The computer-readable storage medium as claimed in claim 19, wherein said processing part is configured for utilizing the threshold value matrix by rotating the threshold value matrix based on the multi-level image data or specified output setting information.

21. The computer-readable storage medium as claimed in claim 20, wherein said processing part is configured for rotating the threshold value matrix so that directions of keytones are identical between a portrait mode of the image forming apparatus which uses an output picture vertically so that a longer side of the picture is vertical and a landscape mode of the image forming apparatus which uses the output picture horizontally so that the longer side of the picture is horizontal.

22. The computer-readable storage medium as claimed in any of claims 19 to 21, wherein said threshold value matrix comprises a plurality of sub matrixes, and a basic matrix for combining the sub matrixes, said sub matrixes and said basic matrix having similar line-group keytones.

23. The computer-readable storage medium as claimed in claim 22, wherein at least said sub matrixes have a size of 3×3 and an inclined line-group keytone.

24. The computer-readable storage medium as claimed in claim 19, wherein said storing part is configured for storing in the table a threshold value matrix which is used to always simultaneously generate three or more dots per gradation level.

25. The computer-readable storage medium as claimed in claim 19, wherein a threshold value immediately before switching a dot size has a value identical to a first threshold value for a dot size of a next stage, within the threshold value matrix.

26. The computer-readable storage medium as claimed in claim 19, wherein said storing part is configure for storing in the table the threshold value matrix excluding a matrix which independently generates a dense dot pattern for which a keytone is not visually recognizable by human eye.

27. The computer-readable storage medium as claimed in claim 19, wherein said storing part is configured for storing in the table the threshold value matrix in which only odd numbered threshold values are used to form an incomplete set of dots at a gradation level where a keytone is easily lost due to increased dot density.

28. The computer-readable storage medium as claimed in claim 19, wherein one side of the threshold value matrix is always a multiple of eight.

29. An image forming apparatus which forms an image on a recording medium from a plurality of dots, comprising:

a processing section carrying out a plural-level process with respect to a multli-level image data to output a plural-level image data which represents a dot pattern by a smaller number of gradation levels than the multi-level image data by use of a threshold value matrix;

a table storing said threshold value matrix which includes threshold values which are used for making a dot representation solely by a dot pattern while maintaining an identical keytone for all halftone levels; and an imaging section forming the image on the recording medium based on the plural-level image data.

30. The image forming apparatus as claimed in claim 29, wherein said processing section uses the threshold value matrix by rotating the threshold value matrix based on the multi-level image data or specified output setting information.

31. The image forming apparatus as claimed in claimed 30, wherein said processing section rotates the threshold value matrix so that directions of keytones are identical between a portrait mode which uses the recording medium vertically so that a longer side of the recording medium is vertical and a landscape mode which uses the recording medium horizontally so that the longer side of the recording medium is horizontal.

32. The image forming apparatus as claimed in any of claims 29 to 31, wherein said threshold value matrix comprises a plurality of sub matrixes, and a basic matrix for combining the sub matrixes, said sub matrixes and said basic matrix having similar line-group keytones.

33. The image forming apparatus as claimed in claim 32, wherein at least said sub matrixes have a size of 3×3 and an inclined line-group keytone.

34. The image forming apparatus as claimed in claim 29, wherein said table stores a threshold value matrix which is used to always simultaneously generate three or more dots per gradation level.

35. The image forming apparatus as claimed in claim 29, wherein a threshold value immediately before switching a dot size has a value identical to a first threshold value for a dot size of a next stage, within the threshold value matrix.

36. The image forming apparatus as claimed in claim 29, wherein said table stores the threshold value matrix excluding a matrix which independently generates a dense dot pattern for which a keytone is not visually recognizable by human eye.

37. The image forming apparatus as claimed in claim 29, wherein said table stores the threshold value matrix in which only odd numbered threshold values are used to form an incomplete set of dots at a gradation level whew a keytone is easily lost due to increased dot density.

38. The image forming apparatus as claimed in claim 29, wherein one side of the threshold value matrix is always a multiple of eight.

* * * * *